(12) United States Patent
Sauvageau et al.

(10) Patent No.: US 10,343,734 B2
(45) Date of Patent: Jul. 9, 2019

(54) TRACK SYSTEM HAVING LOW VIBRATIONS

(71) Applicant: SOUCY INTERNATIONAL INC., Drummondville (CA)

(72) Inventors: Yves Sauvageau, Drummondville (CA); Branislav Nanac, Drummondville (CA); Pascal Lafreniere, Saint-Cyrille-de-Wendover (CA); Frederik Martel, Laval (CA); Jonathan Pellerin, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 133 days.

(21) Appl. No.: 15/515,197

(22) PCT Filed: Sep. 29, 2015

(86) PCT No.: PCT/CA2015/050978
§ 371 (c)(1),
(2) Date: Mar. 29, 2017

(87) PCT Pub. No.: WO2016/049760
PCT Pub. Date: Apr. 7, 2016

(65) Prior Publication Data
US 2017/0225727 A1 Aug. 10, 2017

Related U.S. Application Data

(60) Provisional application No. 62/057,110, filed on Sep. 29, 2014, provisional application No. 62/146,140, (Continued)

(51) Int. Cl.
*B62D 55/096* (2006.01)
*B62D 55/15* (2006.01)
(Continued)

(52) U.S. Cl.
CPC .......... *B62D 55/112* (2013.01); *B62D 55/096* (2013.01); *B62D 55/104* (2013.01); (Continued)

(58) Field of Classification Search
CPC .... B62D 55/104; B62D 55/112; B62D 55/15; B62D 55/096
See application file for complete search history.

(56) References Cited

U.S. PATENT DOCUMENTS 1,255,218 A 2/1918 Paulsen
1,806,819 A 5/1931 Paulsen
(Continued)

FOREIGN PATENT DOCUMENTS

CA 2140600 A1 6/1996
CA 2188103 A1 4/1997
(Continued)

OTHER PUBLICATIONS

U.S. Appl. No. 15/720,316, filed Sep. 29, 2017.
(Continued)

*Primary Examiner* — Kip T Kotter
(74) *Attorney, Agent, or Firm* — BCF LLP

(57) ABSTRACT

The present invention generally relates to vehicle and machinery in agriculture, construction, forestry, mining and powersport. It further generally relates to track systems and traction assemblies used with such vehicles. The track assembly includes components having particular features that, alone or in combination, participate in decreasing the vibrations 5 undergone by the vehicle. According to embodiments, split frames are used with suspension, tandem subassemblies, "tridem subassemblies", adjustable damping components, drive shaft openings, lowering of resulting the track band tension and rosta assemblies.

19 Claims, 44 Drawing Sheets

Related U.S. Application Data filed on Apr. 10, 2015, provisional application No. 62/146,113, filed on Apr. 10, 2015.

(51) Int. Cl.
  B62D 55/104 (2006.01)
  B62D 55/112 (2006.01)
  *B62D 55/108* (2006.01)
  *B62D 55/14* (2006.01)
  *B62D 55/04* (2006.01)
  *B62D 55/12* (2006.01)

(52) U.S. Cl.
  CPC .......... *B62D 55/15* (2013.01); *B60G 2300/32* (2013.01); *B62D 55/04* (2013.01); *B62D 55/108* (2013.01); *B62D 55/12* (2013.01); *B62D 55/14* (2013.01)

(56) References Cited

U.S. PATENT DOCUMENTS

| | | | |
|---|---|---|---|
| 1,980,276 A | 11/1934 | Adolphe | |
| 2,019,654 A | 11/1935 | Valentine | |
| 2,041,599 A | 5/1936 | David | |
| 2,093,456 A | 9/1937 | Knox | |
| 2,386,620 A | 10/1945 | Graham | |
| 2,442,354 A | 6/1948 | Gordon et al. | |
| 2,458,549 A | 1/1949 | Bachman et al. | |
| 2,467,947 A | 4/1949 | Skelton | |
| 2,496,136 A | 1/1950 | Smith | |
| 2,612,742 A | 10/1952 | Heth | |
| 2,998,998 A | 9/1961 | Hyler et al. | |
| 3,706,481 A | 12/1972 | Kramer | |
| 3,774,708 A * | 11/1973 | Purcell | B62D 55/10 180/9.5 |
| 3,841,424 A | 10/1974 | Purcell | |
| 3,938,606 A * | 2/1976 | Yancey | B62D 55/02 180/9.5 |
| 4,519,654 A | 5/1985 | Satzler | |
| 4,923,257 A | 4/1990 | Purcell | |
| 5,316,381 A | 5/1994 | Isaakson et al. | |
| 5,340,205 A | 8/1994 | Nagorcka | |
| 5,452,949 A | 9/1995 | Kelderman | |
| 5,566,773 A | 10/1996 | Gersmann | |
| 5,997,109 A | 12/1999 | Kautsch | |
| 6,003,888 A | 12/1999 | Godbersen | |
| 6,244,613 B1 | 6/2001 | Renger | |
| 6,334,496 B1 | 1/2002 | Hiraki et al. | |
| 6,401,847 B1 | 6/2002 | Lykken | |
| 6,543,861 B1 | 4/2003 | Kahle et al. | |
| 7,556,130 B2 | 7/2009 | Lamoureux et al. | |
| 7,597,161 B2 | 10/2009 | Brazier | |
| 8,083,242 B2 | 12/2011 | Brazier | |
| 8,291,993 B2 | 10/2012 | Juncker | |
| 8,469,124 B2 | 6/2013 | Allaire | |
| 8,640,797 B2 | 2/2014 | Allaire | |
| 8,763,716 B2 | 7/2014 | Rosenbloom | |
| 8,764,129 B2 | 7/2014 | Simula et al. | |
| 2004/0032107 A1* | 2/2004 | Timoney | B60G 3/145 280/124.128 |
| 2004/0099451 A1* | 5/2004 | Nagorcka | B62D 55/084 180/9.5 |
| 2007/0029871 A1 | 2/2007 | Wake et al. | |
| 2010/0237691 A1 | 9/2010 | Busley et al. | |
| 2011/0315459 A1* | 12/2011 | Zuchoski | B60W 50/082 180/9.21 |
| 2012/0242121 A1 | 9/2012 | Ulrich | |
| 2012/0242141 A1 | 9/2012 | Bessette et al. | |
| 2012/0242142 A1 | 9/2012 | Kautsch et al. | |
| 2014/0125118 A1 | 5/2014 | Nagorcka et al. | |
| 2015/0266524 A1 | 9/2015 | Rackow et al. | |
| 2017/0225727 A1 | 8/2017 | Sauvageau et al. | |

FOREIGN PATENT DOCUMENTS

| | | |
|---|---|---|
| CA | 2668234 A1 | 12/2009 |
| CA | 2832180 A1 | 5/2014 |
| DE | 19919959 A1 | 11/2000 |
| DE | 102014003964 A1 | 9/2015 |
| EP | 2921378 A2 | 1/2016 |
| GB | 570190 A | 6/1945 |
| JP | 07142108 A | 6/1995 |
| WO | 2011154533 A1 | 12/2011 |

OTHER PUBLICATIONS

International Search Report from PCT/CA2015/050978 dated Dec. 22, 2015, Zarifa, Adeeb.
English abstract of DE 102014003964 retrieved from Espacenet on Mar. 29, 2017.
English abstract of JPH07142108 retrieved from Espacenet on Mar. 29, 2017.
English abstract of DE 19919959 retrieved from Espacenet on Mar. 29, 2017.
English abstract of EP 15150462 retrieved from Espacenet on Mar. 29, 2017.
English abstract of EP 2921378 retrieved from Espacenet on Mar. 29, 2017.
U.S. Appl. No. 15/565,440, filed Apr. 11, 2016.
U.S. Appl. No. 15/565,450, filed Apr. 11, 2016.
U.S. Appl. No. 15/784,024, filed Oct. 13, 2017.
U.S. Appl. No. 15/784,032, filed Oct. 13, 2017.

* cited by examiner

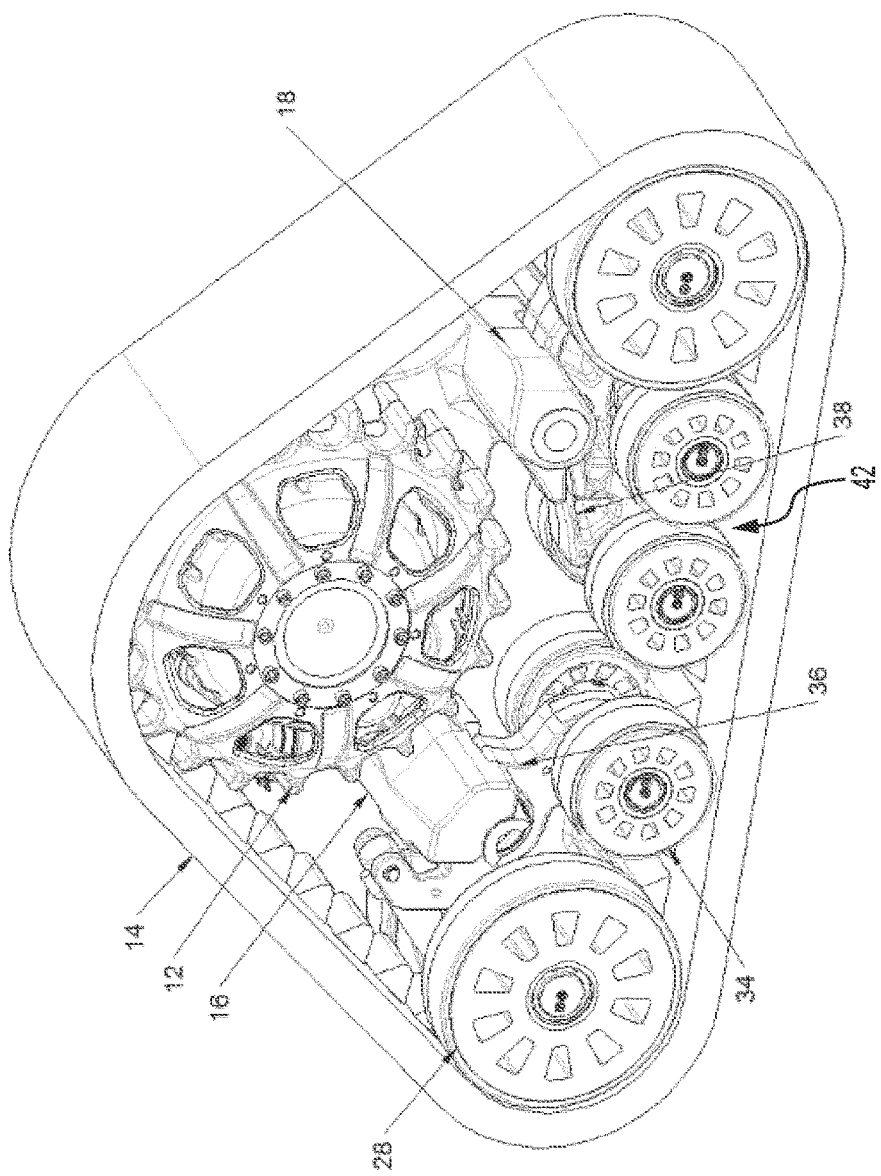

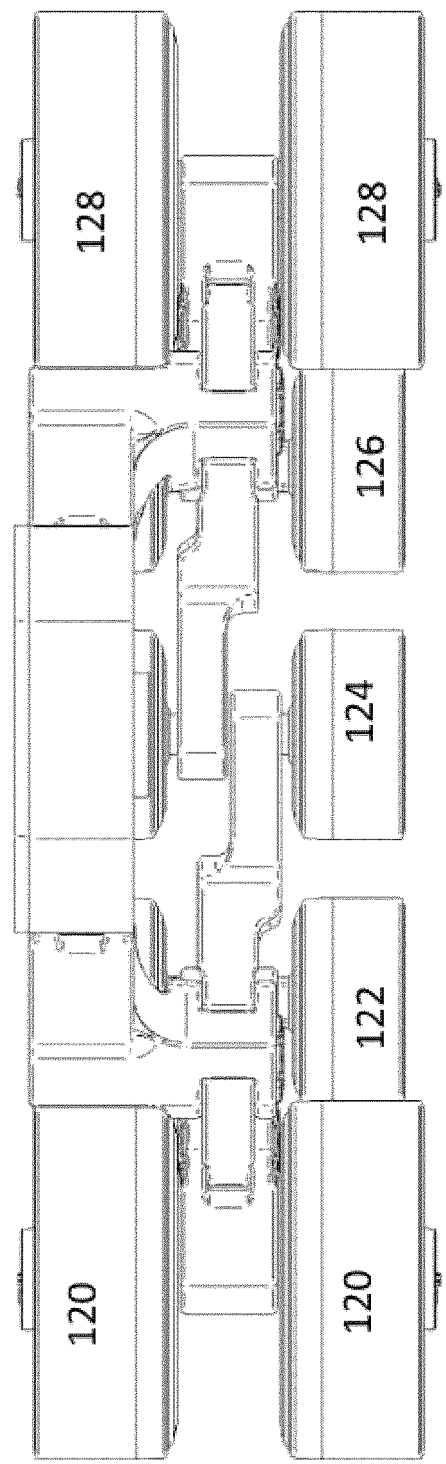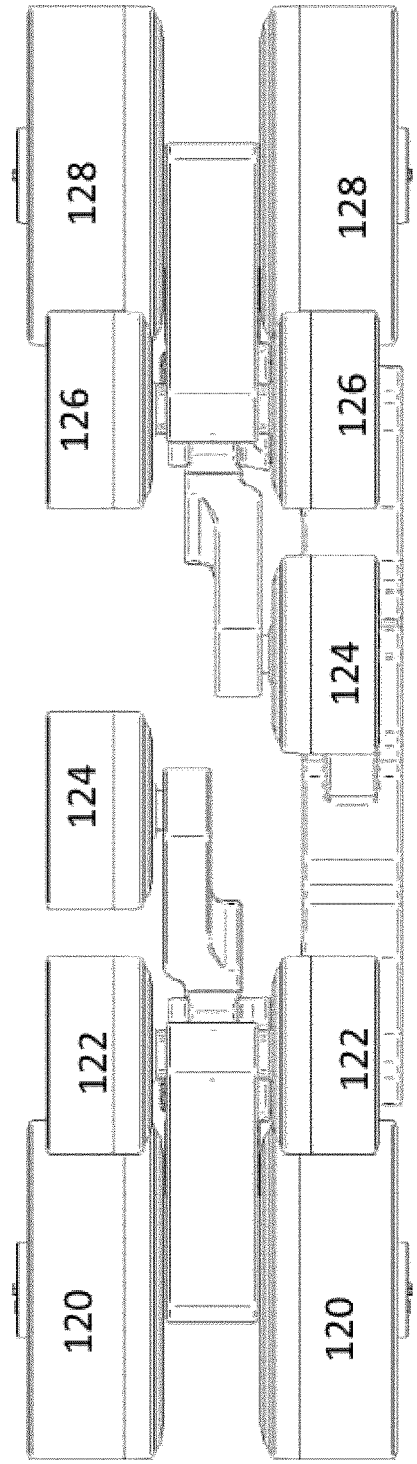
FIG. 25 A
FIG. 25B

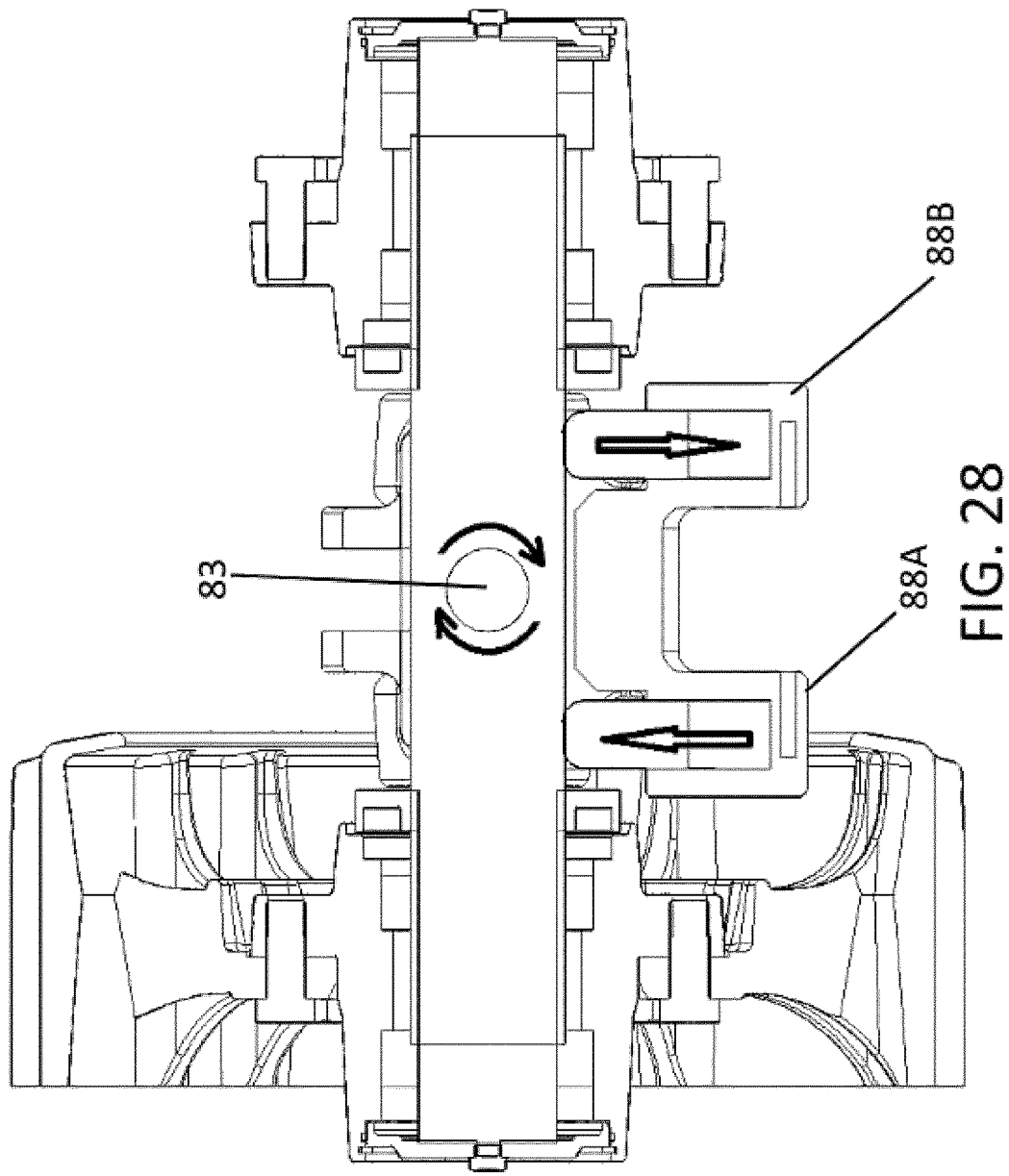

TRACK SYSTEM HAVING LOW VIBRATIONS

CROSS-REFERENCE TO RELATED APPLICATIONS

The present patent application claims the benefits of priority of U.S. Provisional Patent Application No. 62/057,110, entitled "Track System having reduced vibrations" and filed at the United States Trademark and Patent Office on Sep. 29, 2014.

FIELD OF THE INVENTION

The present invention generally relates to vehicle and machinery in agriculture, construction, forestry, mining and powersport. It further generally relates to track systems and traction assemblies used with such vehicles. More particularly, the present invention may also relate to track systems and traction assemblies for use on vehicles such as, but not limited to, all-terrain vehicles (ATVs), utility-terrain vehicles (UTVs) and side-by-side vehicles (SSVs).

BACKGROUND OF THE INVENTION

Traction and flotation have always been important issues with farming and construction vehicles. Having a vehicle mounted on track systems typically provides lower ground pressure, better traction and better use of the available power at higher traction. This is particularly important when the vehicle is operated on soft ground condition or when increased traction effort is required.

One of the challenges when fitting a track system in replacement of a wheel is to fit the track system within the available space envelope of the former wheel. Typical track systems, which feature a pivoting motion, tend to interfere with surroundings equipment such as fenders, fuel or oil tanks, vehicle chassis, three point hitches, etc.

One of the drawbacks of existing track systems is the comfort. One of the reasons is that existing track systems typically do not benefit from the suspension provided by the layer of air within the tires.

More specifically, the existing prior art systems typically comprise one pivot point pivotally connecting the frame undercarriage to the final drive. Such prior art configuration typically requires that the main axle of the vehicle comprises bearings adapted to support the loads. In alternative prior art solution, such as inventions discloses in US patent application no. 2014/0125118 A1, see for instance element 5 and 6 at FIG. 3, and U.S. Pat. No. 5,899,542, for instance elements 22 and 26 at FIG. 1, a fixed attachment surrounds the sprocket wheel. In such configuration, the support frame or undercarriage is pivotally connected to the fixed attachment using two different pivot point, on each lateral side of the sprocket wheel. In yet another prior art document, U.S. Pat. No. 7,201,242, more particularly FIGS. 4A and 5, the track system is connected to a shaft transmitting power. The shaft comprises bearings to allow supporting load of the axle. The shaft is configured to pass through the sprocket wheel to allow rotation of the undercarriage in-between 2 points on both side of the sprocket wheel.

Also, existing prior art also discloses the use of a split frame, as taught in U.S. Pat. No. 5,452,949 or by Class Terra-Trac system. Such prior art track system comprises a split frame having at least two (2) different pivots point, typically a front secondary pivoting assembly which rotates around the vehicle axle attachment and a rear secondary pivoting assembly which rotates around the front secondary pivoting assembly.

The US patent application no. 2014/0125118 discloses a track system comprising a suspension. The dampening system is attached between a support frame surrounding a sprocket wheel. The suspension system comprises two shock absorbers (19 and 20 of FIG. 1) installed at each extremity of the support frame. The said support frame is pivotally connected to the wheels using multiple pivot points.

Prior art also provide longitudinal movement control systems using elastomeric material, such as US patent application published under no. 2007/0029871 or U.S. Pat. No. 8,083,242. Such prior art disclose solution to limit the movement of longitudinal pivoting movement of support wheels and idler wheels. However, these documents do not provide solution to control lateral movement using elastomeric material system.

Hence, there is a need for track systems which can preferably offer most if not all the advantages of track propulsion while fitting in the space envelop of the wheels they replace. Furthermore, there is a need to optimize the existing track system geometry in order to reduce vibration and to provide comfort level higher or at least equal than the level of comfort found in vehicles using tires.

SUMMARY OF THE INVENTION

The shortcomings of the prior art are generally mitigated by the track assembly herein described that maximizes road comfort. The track assembly comprises a sprocket, an optional final drive, an optional one piece main frame, an optional front split frame, an optional rear split frame, at least one secondary pivoting assembly, at least one idler wheel, a plurality of sets of support wheels, at least one shock absorber, a spring, a track band, frame components, etc. The track assembly comprising these components is assembled in particular configurations for the track assembly as a whole to minimize the vibration that are communicated through the assembly to the vehicle and accordingly to the vehicle operator.

For sake of clarity, the expression "support frame" used throughout this document shall be understood as a unitary support frame or as a multiple portions support frame, such as a split frame or a frame comprising multiple pivoting portions.

Accordingly to embodiments, the present invention present a track suspension maximizing road comfort comprising, a sprocket, an optional final drive, an optional one piece main frame, an optional front split frame, an optional rear split frame, a longitudinal tandem assembly (also referred as "bacchu"), idler wheels, support wheels, shock absorber, spring, track band, etc.

In one aspect of the invention, a track assembly comprises an undercarriage component having a hole or opening allowing the undercarriage to rotate with respect to the main pivot axle and to transmit power to the sprocket wheel. Accordingly, the resulting arrangement is configured to include the vehicle axle attachment, an undercarriage or split frames, a final drive and finally a sprocket wheel.

One of the aspects of the present disclosure is to provide a track system comprising a central pivot point and being mounted to transmit power to the final drive. Another object of the present disclosure is to provide a track system adapted to substantially limit the load on the vehicle final drive, gearbox and/or planetarium.

Another object of the invention is to provide a track system comprising a split frame using a single pivot.

In another embodiment of the invention, a front and rear secondary pivoting assembly including 3 links suspension, one of these links is a cylinder including spring and/or shock absorber.

One of the aspect of the present invention is to aim at limiting the volume required by a suspension system in a track system. The track system of the present invention comprises a central pivot joint and a single suspension system.

Another aspect of the present invention is to provide a track tension wherein a rear idler is located slightly under a main frame or a split frame pivot (FIG. 1). Such configuration aims at positioning the track assembly as to climb out of the ground instead of digging into the ground during tractive effort.

A further aspect of the present disclosure in to provide longitudinal tandem pivotally connected to the support using secondary pivots installed at specific positions. Such positions shall be determined in order to substantially balance load pressure between all wheels/track systems. Such aspect of the present disclosure aims at preventing ground damage due to compaction under the load of each axle of the vehicle and at maintaining the track band perimeter variation in an acceptable range during travel of the suspension system.

Yet another object of the present disclosure is to aim at maintaining performances of the machinery without respect to load/weight sustained by the machinery. Understandably, load/weight of agriculture machinery or other types of vehicles may greatly vary during operation Another aspect of the present invention is to provide a constant damping rate using progressive or different steps damping values without regard to the driving conditions, the terrain or the load on the vehicle. Thus, the damping value is changed as a function of the change in the force applied on the vehicle (such as weight variation). Accordingly, a proper damping rate or ratio may be achieved across all cylinder strokes. The damping value may be calculated using any appropriate damping rate equation.

One aspect of the invention is to provide an optional passive system on a track vehicle, the passive system being configure to provide a substantially optimal damping value, without any intervention of the vehicle operator, electric automate or any connection between vehicle and track system to adjust the damping value. Such configuration may also use a semi-active and active suspension system. In such configurations, the stroke position or load value adjusts the damping value. Broadly, the change of the damping value may be obtained by limiting the oil circulation at a minimum cylinder stroke or increasing the oil circulation at full extension of the cylinder. As an example, adding one or more progressive groove openings onto cylinder surface may allow the progressive change of the damping value.

Dynamic damping may be embodied by following damping increments or steps or using any variable or adaptable damping systems known in the art. Such an embodiment aims at replacing a constant damping ratio with a damping ratio within a predetermined range. Such damping increments may be embodied by using a plurality of oil tubes each configured to provide different damping values. The tubes are adapted to be closed or opened with respect to the position of the cylinder stroke.

Yet another aspect of the present disclosure is to provide a lateral rotation of support wheel and/or of idlers wheels using lateral elastomeric material resilient member. The use of such lateral elastomeric resilient member aims at increasing the ride comfort on uneven pavement.

Still, another aspect of the present invention is to provide a tracking adjustment to a track system. The track adjustment may, for example, comprise at least two grease or oil cylinders. The track adjustment aims at allowing an operator to adjust a track without removing one or more wheels, more typically idler wheels. The system typically comprises oil or grease lines which may be routed across the track assembly to provide an easy access location. According to one embodiment, the grease or oil cylinders are located on each side of a turning axle.

Yet another aspect of the invention is to provide a track system having a plurality of wheels comprising a front idler wheel axle, typically three support wheel axles and a rear idler wheel axle. The axles are all mounted on tandem, thereby aiming at reducing vibration. A first subassembly, typically located at the front end of the track system, connects the front idler wheel and one or more first support wheels. The first subassembly is pivotally connected to a first end of the support frame to allow longitudinal pivoting movement. A second subassembly, typically located at the rear end of the track system, comprises second idler wheels set and one or more set of support wheels, each set of idler and support wheels being pivotally mounted to the second subassembly. The second subassembly is pivotally connected to a second end of the support frame. This free pivoting of the subassemblies allows a longitudinal elongation of the track assembly, aiming at reducing the vertical movement of the main pivot point and at increasing the ride comfort of the operator of the vehicle.

According to an optional feature, a suspension is integrated in these links to increase the ride comfort. This suspension may be progressive.

Yet another optional feature, a first and last support wheel may be mounted in lateral tandem to increase ride comfort and track lifetime.

Another aspect of the invention is to provide a track system for a vehicle, the track system comprising a drive wheel configured to be mounted to the vehicle and a support frame comprising a first portion pivotally connected to a second portion, at least one of the first and second portions comprising an aperture and a suspension system controlling the pivoting movement of each of the two portions in relation to the other portion. The track system further comprises front idler wheels pivotally mounted to the support frame, rear idler wheels pivotally mounted to the support frame, road wheels pivotally mounted to the support frame, and an endless track disposed about the drive wheel, the front and rear idler wheels, and the road wheels, the endless track defining an overall perimeter of the track system.

The track system may further comprise an aperture adapted to allow passage of a drive shaft of the vehicle and the pivoting of each of the two portions in relation to the other portion.

In another aspect of the invention, each portion of the support frame comprises an aperture, one of the apertures being adapted to receive a mechanical stop adapted to limit the pivoting of each of the two portions in relation to the other portion.

In a further aspect of the invention, the first and second portions of the support frame are coupled to a final drive, the final drive being coupled to the drive shaft.

In yet another aspect of the invention, each portion of the support frame comprises an aperture at one end of each of the portions, the pivoting connection between the first and second portions being formed by the superposition of the aperture of the first and second portions.

The suspension system may also be embodied as a variable damping system.

Another aspect of the invention is to provide a track system for a vehicle, the track system comprising a drive wheel configured to be mounted to the vehicle and a support frame comprising a front portion pivotally connected to a rear portion, at least one of the front and rear portions being adapted to allow passage of a drive shaft of the vehicle through the support frame and the pivoting of the each of the front and rear portions in relation to the other portion, and a suspension system controlling the pivoting movement of each of the two portions in relation to the other portion. The track system further comprises front idler wheels pivotally mounted to the front portion of the support frame, rear idler wheels pivotally mounted to the rear portion of the support frame, at least one set of road wheels, wherein a first road wheel is pivotally mounted to the front portion of the support frame and a second road wheel is pivotally mounted to the rear portion of the support frame and wherein the first road wheel and second road wheels are substantially aligned with respect to a lateral axis in a rest position, and an endless track disposed about the drive wheel, the front and rear idler wheels, and the road wheels, the endless track defining an overall perimeter of the track system.

A further aspect of the present invention a track system wherein the first road wheel and/or second road wheel is configured to independently move in relation with the second road wheel and/or the first road wheel.

Yet another aspect of the invention provides a track system wherein the front idler wheels and at least one road wheel are pivotally mounted to a front tandem support frame, the front tandem support frame being pivotally connected to the first portion of the support frame.

The suspension system may be based on a step function.

Another aspect of the invention is to provide a track system for a vehicle, the track system comprising a drive wheel configured to be mounted to the vehicle and a support frame comprising a first portion pivotally connected to a second portion, at least one of the first and second portions adapted to pivot upon each first and second portions with respect to a single pivot point and a suspension system controlling the pivoting movement of each of the two portions in relation to the other portion. The track system further comprises front idler wheels pivotally mounted to the support frame, rear idler wheels pivotally mounted to the support frame, road wheels pivotally mounted to the support frame, and an endless track disposed about the drive wheel, the front and rear idler wheels, and the road wheels, the endless track defining an overall perimeter of the track system.

A further aspect of the invention is to provide the track system wherein the front idler wheels and at least one road wheel are pivotally mounted to a front tandem support frame, the front tandem support frame being pivotally connected to the first portion of the support frame.

Yet another aspect of the invention is to provide the track system wherein the rear idler wheels and at least one road wheel are pivotally mounted to a rear tandem support frame, the rear tandem support frame being pivotally attached to the second portion of the support frame.

Each portion of the support frame may further comprise an aperture at one end of each of the potions, the pivoting connection between the first and second portions being formed by the superposition of the aperture of the first and second portions.

Another aspect of the invention is to provide a track system for a vehicle, the track system comprising a drive wheel configured to be mounted to the vehicle and a support frame comprising at least one aperture to allow the passage of a drive shaft of the vehicle through the support frame, the support frame being pivotally mounted on a axle of the vehicle. The track system further comprises front idler wheels pivotally mounted to the support frame, rear idler wheels pivotally mounted to the support frame, road wheels pivotally mounted to the support frame, and an endless track disposed about the drive wheel, the front and rear idler wheels, and the road wheels, the endless track defining an overall perimeter of the track system.

Another aspect of the invention is to provide a track system for a vehicle, the track system comprising a drive wheel configured to be mounted to the vehicle, a support frame, front idler wheels pivotally mounted to the support frame, rear idler wheels pivotally mounted to the support frame, road wheels pivotally mounted to the support frame using a lateral tandem assembly. The lateral tandem assembly comprises an axial component having a first shape, an axle comprising an aperture having a shape compatible with the first shape and adapted to receive the axial component, the wheels being pivotally mounted on the axle, a casing comprising an aperture for receiving the axial component, the aperture having a second different than the first shape, and elastomeric components inserted around the axial component and in the casing, the elastomeric components filling remaining volume within the casing. The track system further comprises an endless track disposed about the drive wheel, the front and rear idler wheels, and the road wheels, the endless track defining an overall perimeter of the track system.

The first shape may be embodied as a square and the second shape may be embodied as a rounded rectangle.

The casing may further comprises a first portion and a second portion, the first and second portions being adapted to receive each other and to be attach to each other to retain the axial component and elastomeric components.

The lateral tandem assembly of the track system may further comprise two casing, one on each side of the axle, each casing being configured to receive one end of the axial component.

The support frame may further comprise a first portion pivotally connected to a second portion, at least one of the first and second portions adapted to pivot upon each first and second portions with respect to a single pivot point, and a suspension system controlling the pivoting movement of each of the two portions in relation to the other portion.

The at least one of the first and second portions may be adapted to allow passage of a drive shaft of the vehicle through the support frame and the pivoting of the each of the two portions in relation to the other portion.

Another aspect of the invention is to provide a track system for a vehicle, the track system comprising a drive wheel configured to be mounted to the vehicle, a support frame, road wheels pivotally mounted to the support frame, and front idler wheels pivotally mounted to the support frame, the front idler wheels and at least one road wheel being pivotally mounted to a front tandem support frame, the front tandem support frame being pivotally connected to the support frame. The front tandem support comprises a tandem support structure, and a suspension system connecting the pivoting connection and the tandem support structure. The track system further comprises rear idler wheels pivotally mounted to the support frame, the rear idler wheels and at least one road wheel being pivotally mounted to a rear tandem support frame, the rear tandem support frame being pivotally attached to the second portion of the support frame, and an endless track disposed about the drive wheel, the front and rear idler wheels, and the road wheels, the endless track defining an overall perimeter of the track system.

The suspension system of the track system may be a cylinder comprising a combination of a spring and a shock absorber.

Another aspect of the invention is to provide a tracking adjustment system to adjust alignment of a set of wheels of a track system without removing wheels of the track system, the set of wheels being pivotal with respect to a pivoting axis, the tracking adjustment system comprising two pressuring systems on each side of the axis, each pressuring system being configured to allow increase and decrease of its internal pressure, each pressuring system being configured to force pivoting of the set of wheels with respect to the axis by the increase of pressure in a first pressuring system and by the decrease of pressure in the second pressuring system.

The tracking adjustment system may comprise a single pressuring system on one side of the axis, the pressuring system being connected to the axle and being configured to allow increase and decrease of internal pressure, the pressuring system being configured to force pivoting of the set of wheel with respect to the axis when pressure is increased or decreased. The pressuring systems may be cylinders.

The pivoting axis of the tracking adjustment system may be substantially vertical.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIGS. 1A and 1B are external side and perspective views of a track assembly in accordance with the principles of the present invention.

FIGS. 25A and B are upper views of a track system comprising unconnected support wheels.

FIG. 28 is a top view of the track adjustment system of FIG. 26.

DETAILED DESCRIPTION OF THE PREFERRED EMBODIMENT

Figure 1A:
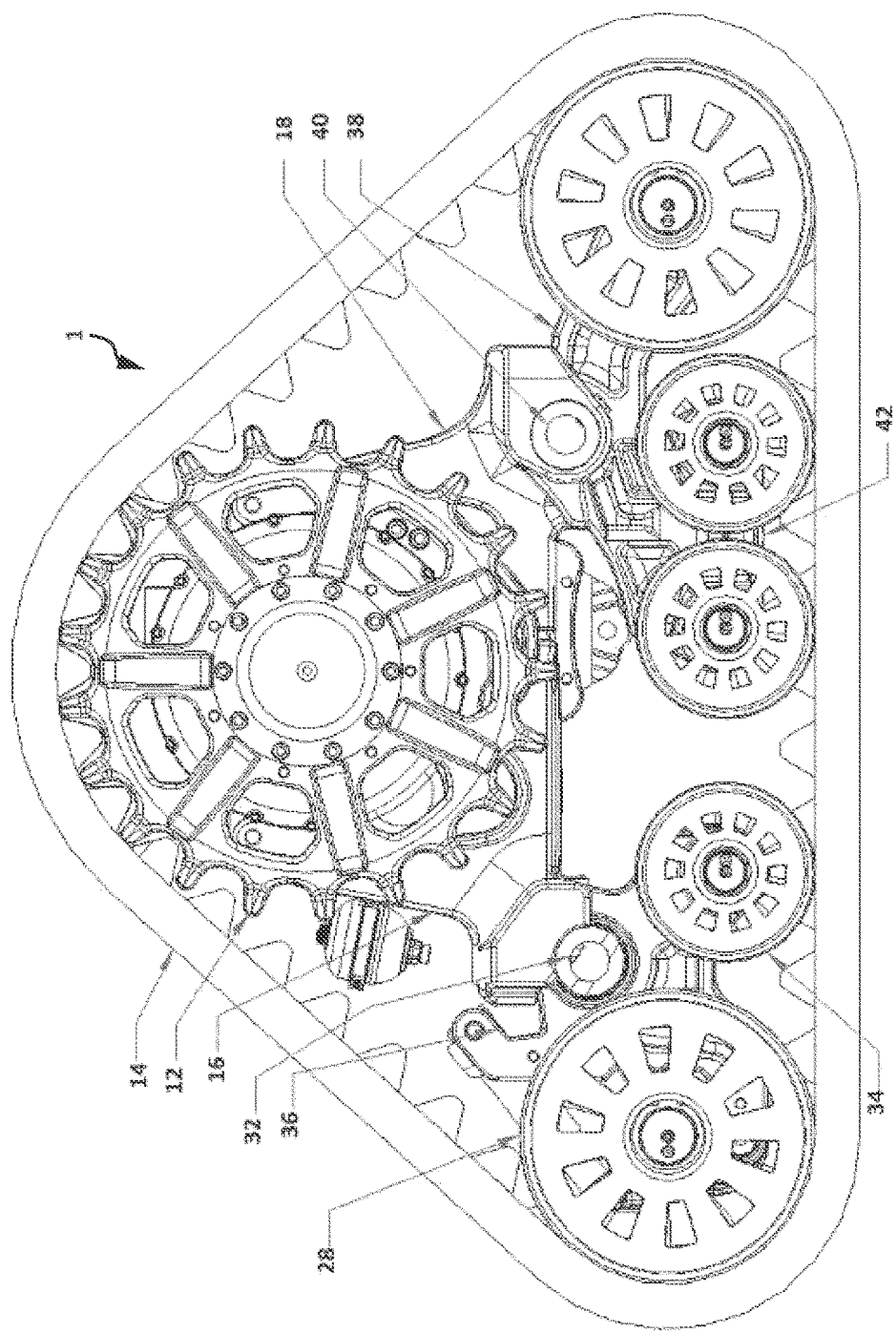
Figure 2:
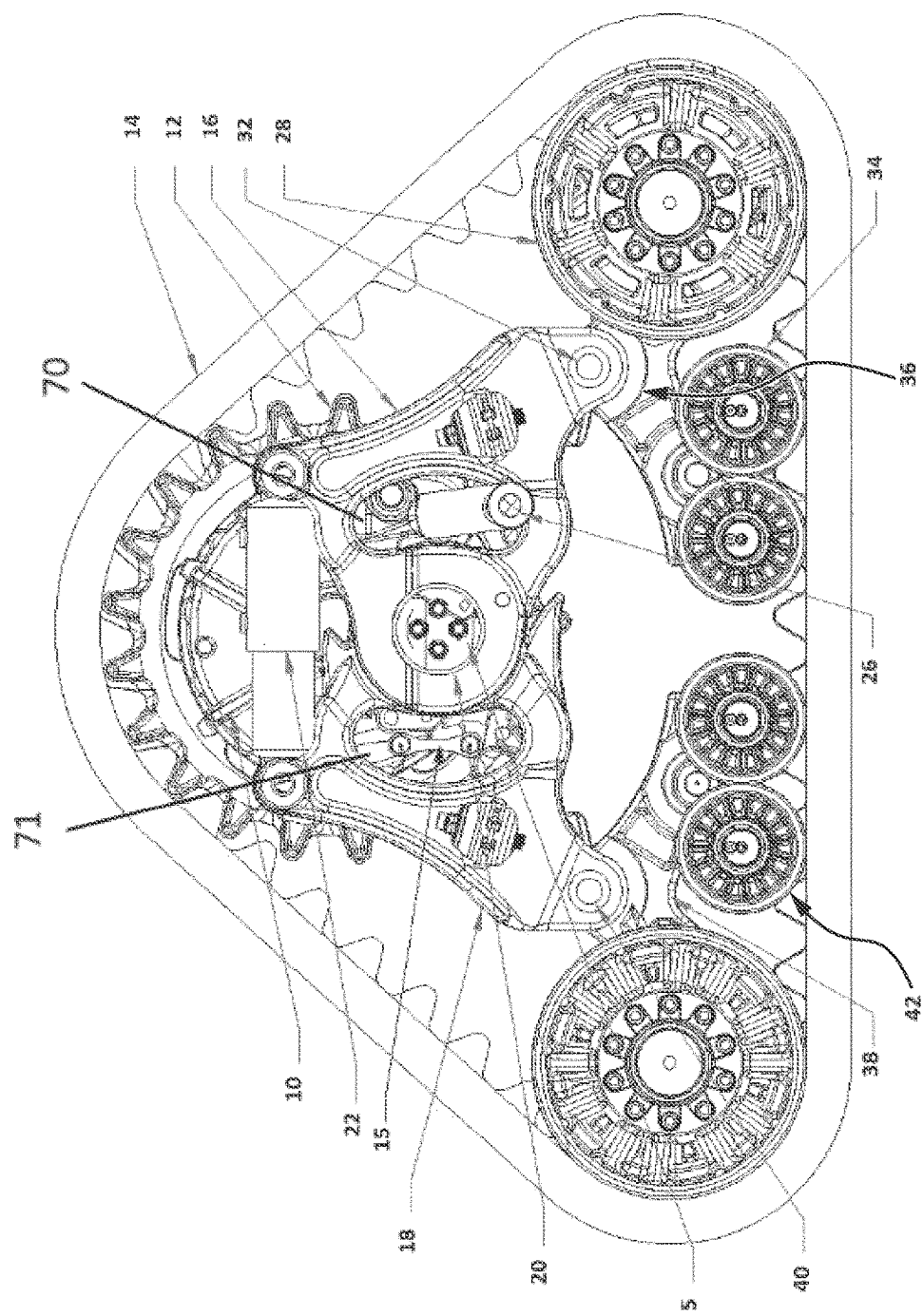
FIG. 2 is an internal side view of the track assembly of FIG. 1.
Figure 3A:
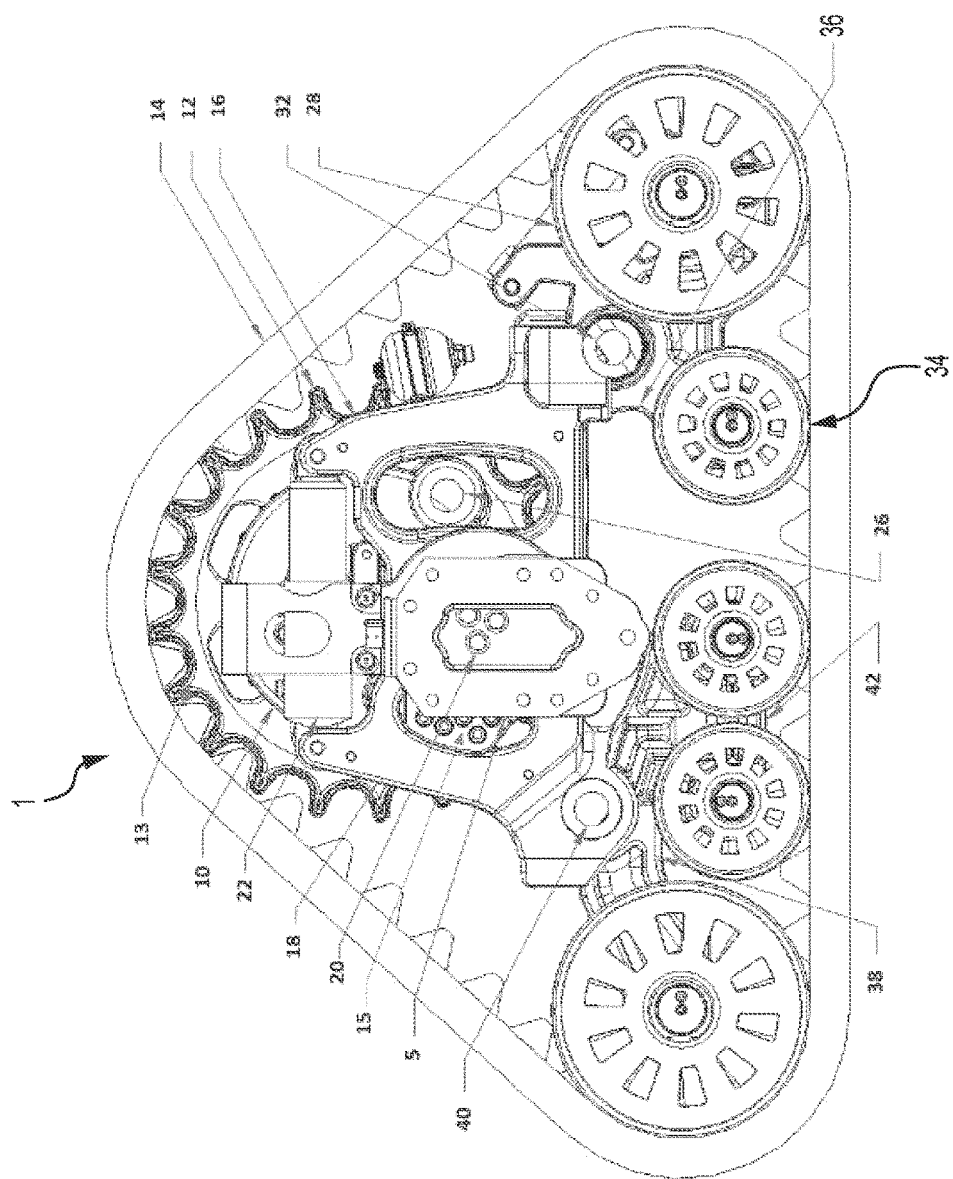
FIGS. 3A and 3B are internal side and perspective views of a track assembly in accordance with the principles of the present invention shown having a drive shaft passing through the support frame.
Figure 3B:
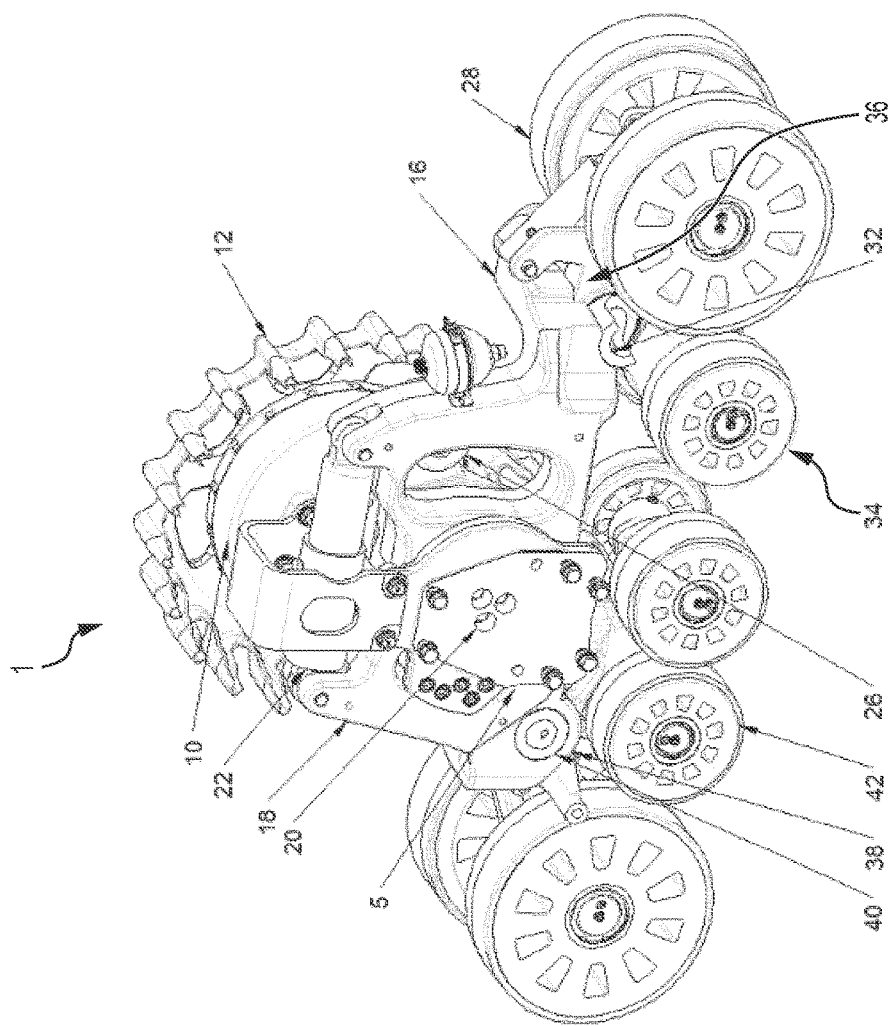
Figure 4:
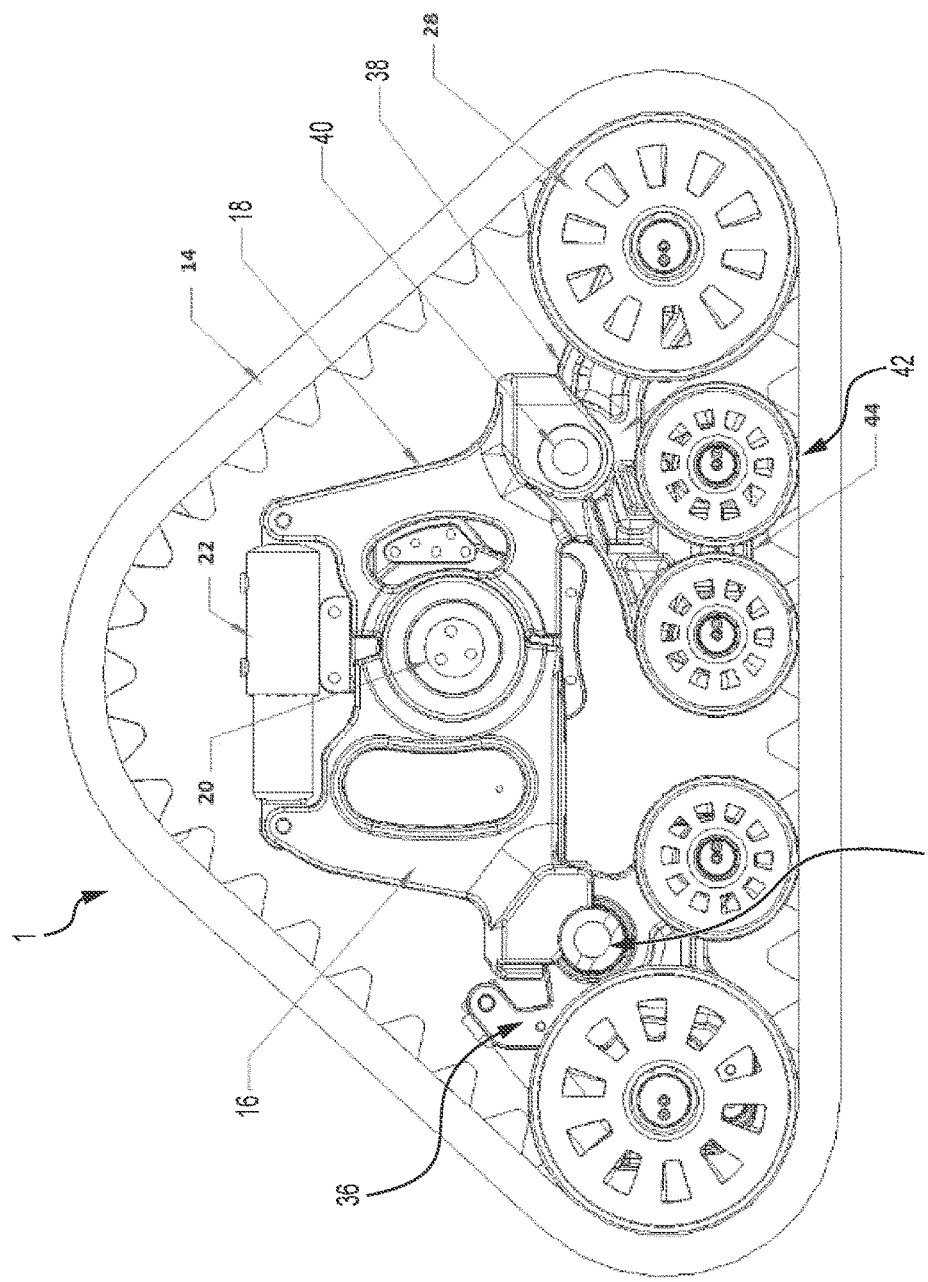
FIG. 4 is a side external view of the track assembly of FIG. 3 shown without a drive wheel.

A novel Track system having reduced vibration will be described hereinafter. Although the invention is described in terms of specific illustrative embodiments, it is to be understood that the embodiments described herein are by way of example only and that the scope of the invention is not intended to be limited thereby.

Referring to FIGS. 1A-B, 2, 3A-B and 4 to 5, an exemplary track system 1 (a.k.a. track assembly) in accordance with the principle of the present invention is shown. In FIG. 1, the track system 1 is well adapted for an agricultural vehicle such as a tractor, a harvester or any utility cart or trailer. Understandably, in other embodiments, the track system 1 could be mounted to other types of vehicles such as, but not limited to, all-terrain vehicle (ATV), utility-terrain vehicles (UTV), side-by-side vehicles (SSV), and other similar vehicles. The vehicle may be used for different purposes, such as but not limited to agriculture, construction, forestry, mining, military and powersport. The track system 1 typically comprises a sprocket wheel 12 configured to be mounted to the wheel axle or hub 5 of a vehicle (not shown), a support frame 16 and 18, at least two idler wheels 28, and an endless traction band 14 disposed around the sprocket wheel 12 and the support frame 16 and 18.

Still referring to FIGS. 1A-B, 2, 3A-B and 4 to 5, the sprocket wheel 12 generally comprises a plurality of generally evenly spaced sprocket teeth 13 located at the periphery thereof. The sprocket teeth 13 are configured to drivingly engage the drive lugs of the traction band 14.

The sprocket wheel 12 typically comprises a circular disk having formed therein first circularly disposed apertures configured to reflect the bolt pattern of the vehicle axle/hub 5 such as to receive the mounting bolts thereof, and second circularly disposed apertures configured to receive the fastening bolts of the sprocket wheel 12 and of the flange of the shaft which will be described in more details below.

Understandably, in some other embodiments, the sprocket wheel 12 could be unitary or the sprocket wheel 12 could have more than two sections. In addition, in still other embodiments, the disk could be unitary with the sprocket wheel 12 or could even be omitted.

Figure 5:
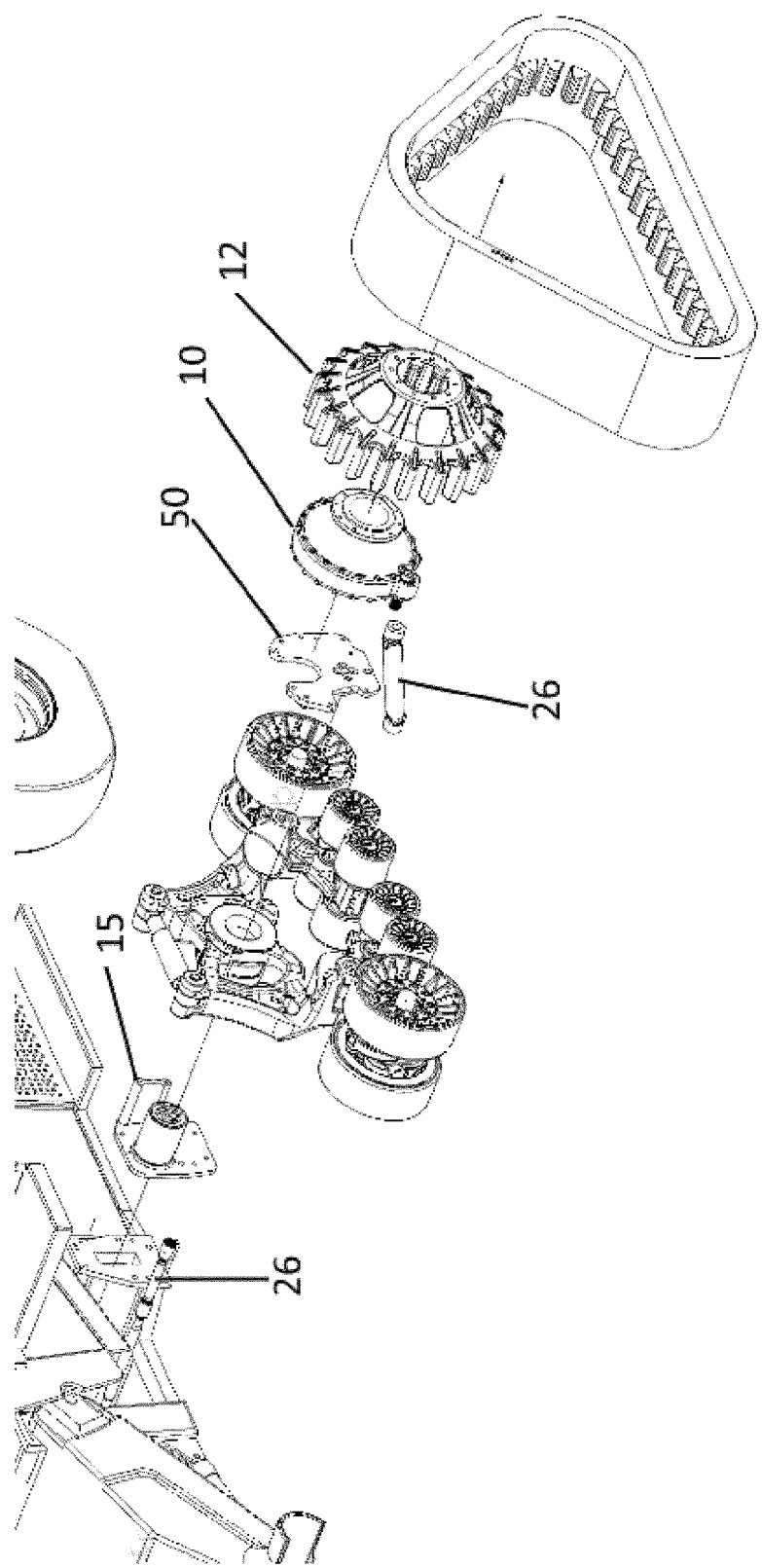
FIG. 5 is an exploded perspective view of a track assembly to be attached to a vehicle in accordance with the principles of the present inventions.

As seen in FIG. 5, the hub of the vehicle may be pivotally mounted to a plate 50. The plate 50 is adapted to receive a final drive or gearbox 10. The sprocket wheel 12 is pivotally mounted to the final drive or gearbox 10.

Still referring to FIGS. 1A-B, 2, 3A-B and 4 to 5, in a preferred embodiment, the track system 1 (or track assembly) comprises a final drive, gearbox or transmission or any power transmitting system 10 connected to the axle or driving shaft 26 of the vehicle, the axle or driving shaft 26 transmitting the power to the track system 1. Understandably, any configuration of axle or driving shaft 26 may be used, such as straight or joint shaft. A sprocket wheel 12 is coupled to the final drive 10 and transfers the rotation of the final drive 10 to the track band 14. In a preferred embodiment, the support frame may comprise at least one passage, opening or aperture 70 in which the frame may freely move around the driving shaft 26, vertically and/or horizontally, while absorbing vibrations or shocks. In other embodiments, support frame may comprise a second passage, opening or aperture 71. Such second passage 71 is typically present to allow the track system to be installed on the other side of the vehicle or may be configured to act as a stopper for limiting the pivoting of the support frame. In an embodiment configured to act as a stopper, a mechanical member 15 configured to stop the movement of a portion of the support frame 16 and 18. Such configuration typically aims at reducing or limiting the interference with other equipment or parts. In another embodiment, the passage 70 or 71 may be configured to substantially surround the driving shaft 26 or the mechanical stopper member, such as being C-shaped configuration or U-shaped, etc.

In another embodiment, the support frame 16 and 18 may comprise two pivoting portions, a first pivoting portion 16, such as a front split frame and a second pivoting portion 18, such as a rear split frame. The first pivoting portion 16 and the second pivoting portion 18 are pivotally coupled to the hub 5 of the vehicle according to a single pivot point 20 (a.k.a. main pivot or split frames pivot). In such an embodiment, the first pivoting portion 16 and the second pivoting portion 18 are coupled to a damper system or suspension element 22, such as a shock or absorbing cylinder coupled to a spring. Understandably, any suspension system 22 minimizing the vibration and pivoting movement between the first and second pivoting portions 16 and 18 may be used.

The suspension system 22 absorbs the vibrations undergone by the track system 1. In some embodiments, the first and second pivoting portions 16 and 18 may comprise an accumulator such as a spring, not shown on FIGS. 1A-B, 2, 3A-B and 4 to 5 which aims at preventing the kit to be fully compressed or at improving the absorption of vibrations undergone by the track system 1.

In embodiments requiring the passage of a driving shaft 26 through the supporting frame 16 and 18, such as track systems 1 configured to receive power from the vehicle, at least one of the pivoting portions 16 or 18 is configured to allow the driving shaft 26 to transverse the support frame 16 and 18 as explained above.

In an another embodiment having a first and second pivoting portions 16 and 18, the first split frame 16, typically located at the front of the vehicle, may comprise a pivot 32 allowing the rotational movement of a first idler wheel 28 and a plurality of support wheels 34, such as a single set of a wheels, a plurality of longitudinally spaced apart sets of wheels or longitudinally spaced apart wheels. Such structure may be referred as a secondary pivoting assembly 36 or "Bacchu". Thus, the front idler wheel 28 and the plurality of front support wheels 34 are rotatively mounted to the first pivoting portion 16 and thereby compose a first secondary pivoting assembly 36.

Similarly, the second portion or rear split frame 18 is pivotably connected to a second or rear idler wheel (not shown on FIGS. 1A-B and FIG. 2) via a second secondary pivoting assembly 38. As a consequence, the second pivoting portion 18 comprises a pivot 40 which allows the rotation of the second secondary pivoting assembly 38 with respect to the second pivoting portion 18. Thus, the second or rear idler wheel and the plurality of rear support wheels (not tagged) are rotatively mounted to the second pivoting portion 18.

Still referring to FIGS. 1A-B, 2, 3A-B and 4 to 5, in a preferred embodiment, the support frame 16 and/or 18 is configured to pivot around a central axis through an aperture acting as a pivot 20.

Figure 6:
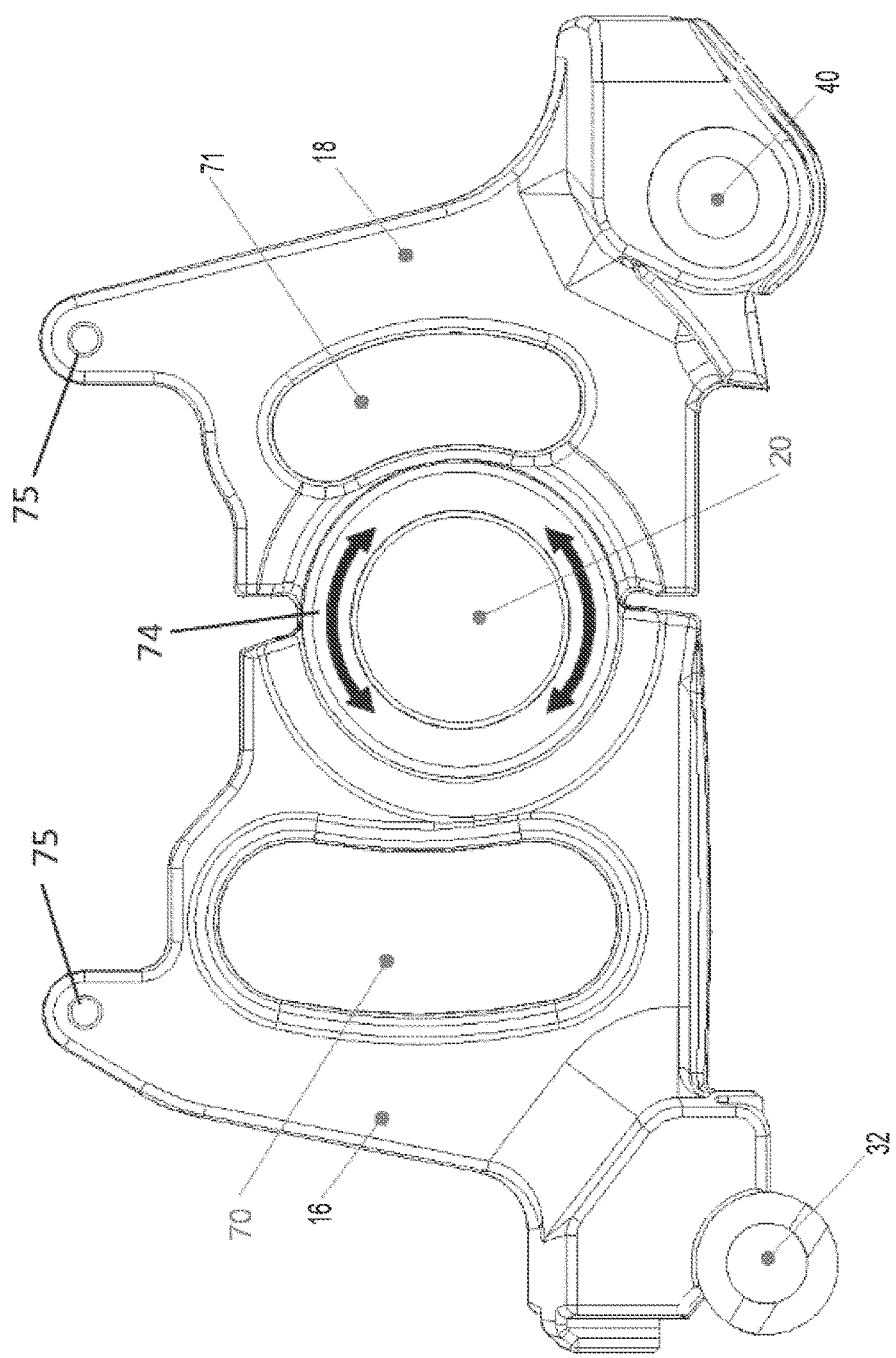
FIG. 6 is a perspective view of two split frame portions of a track assembly in accordance with the principles of the present invention being pivotally mounted.
Figure 7:
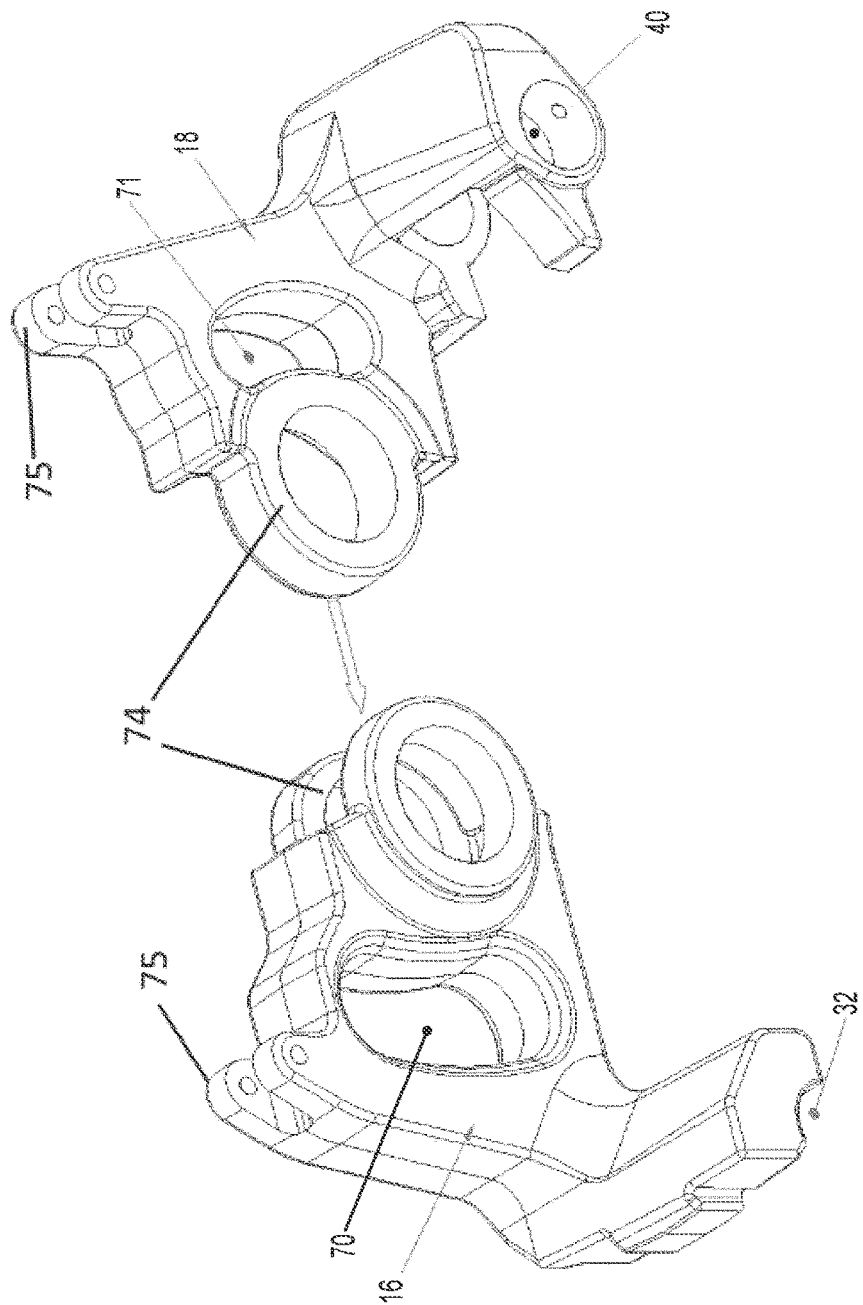
FIG. 7 is a perspective view of two detached portions of a track assembly formed by the superposition mounting of a double aperture of a first portion and a single aperture of a second portion in accordance with the principles of the present invention.
Figure 8:
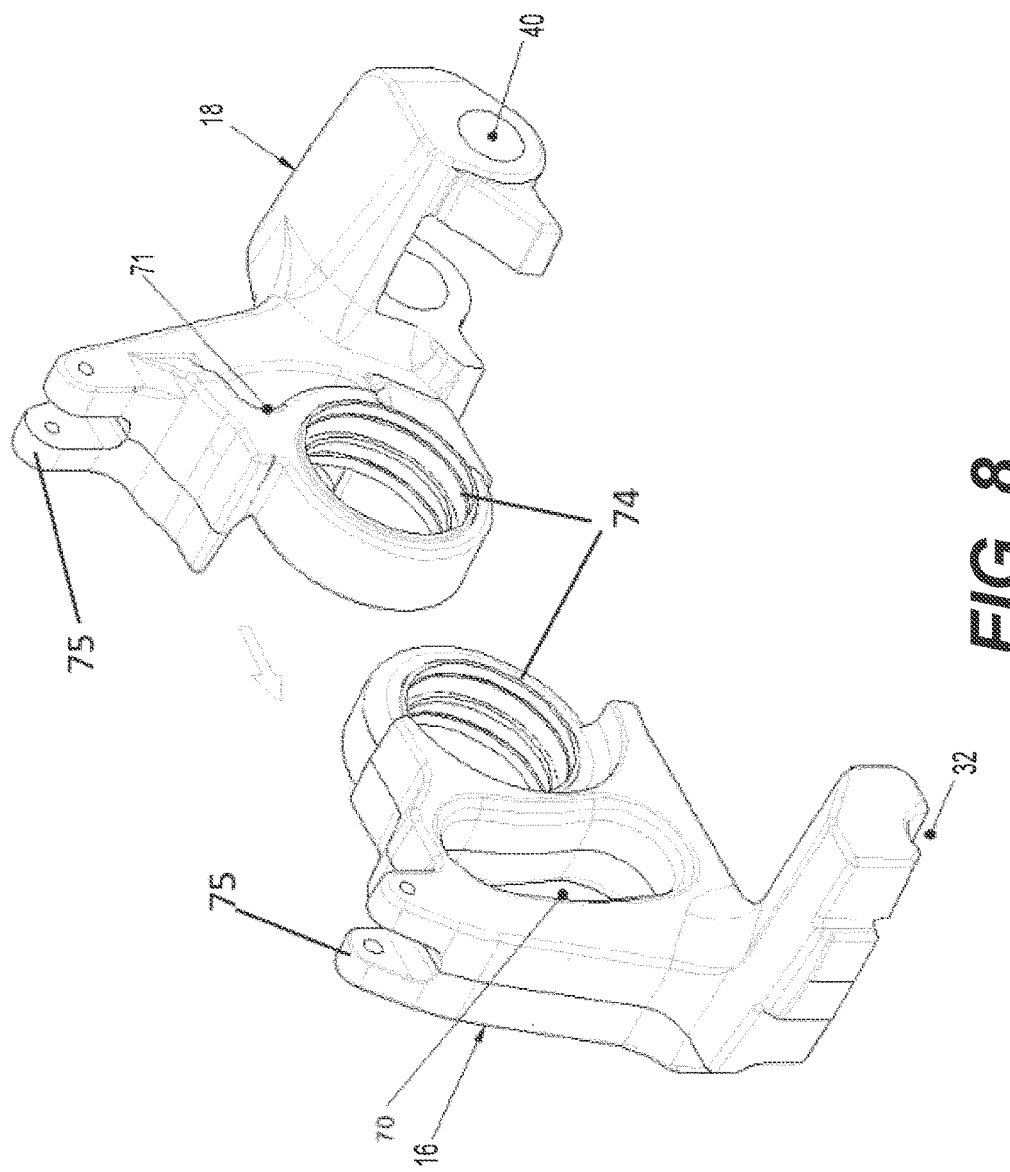
FIG. 8 is a perspective view of two detached portions of a track assembly formed by the superposition mounting of the aperture of each portion in accordance with the principles of the present invention.

Now referring to FIGS. 6 to 8, a first portion 16 and a second portion 18 of a track system having a first pivoting portion 16 and a second pivoting portion 18 are shown without any other components. As shown in FIGS. 7 and 8 each portion 16/18 comprises an aperture or pivot mounting point typically located on one end of the said pivoting portion. The pivot point 20 is formed by superposing the aperture 74 of each portion 16 and 18. The portions 16 and 18 are typically pressed against each other or retained one on the other using a shaft having a first and second end, the first end being mounted on the vehicle axle attachment side and the second end being mounted on the transmission system 10 for embodiments used with traction power, being pivotally mounted to a plate or member pivotally attached to the sprocket wheel 12 or being pivotally mounted to the sprocket wheel 12. Understandably, on embodiments not being driven, such as on trailer kits or on tracking kit without traction, both portions 16 and 18 are retained against each other using the shaft of the axle.

In some embodiments, the pivot point 20 may comprise any means for limiting the friction between the aperture 74 and the retaining mean 5 (such as a shaft or hub), such as but not limited to plain roller, taper bearings, ball, standard bearings or any mechanism known in the art. By limiting the friction, the pivoting of both portions of the support frame 16/18 is smoother and/or more fluid thus aiming at increasing the performance of track system 1. Such configuration also limits the axial movement between the two portions of the support frame, thus limiting wearing of the parts of the two portions being in contact.

Still referring to FIGS. 6 to 8, the first portion 16 and the second portion 18 are shown in mounted and un-mounted configurations. Now referring to the FIG. 6, the aperture 74 of the first 16 and second 18 portions forms a single pivot 20 which allows the portions 16 and 18 to rotate with respect to each other. Typically, each portion 16 or 18 comprises an upper portion 75 configured to receive an end of the suspension system. One skilled in the art shall understand that the upper portion 75 may be located elsewhere and may be configured to receive different types of suspension systems 22 and/or springs.

Figure 11:
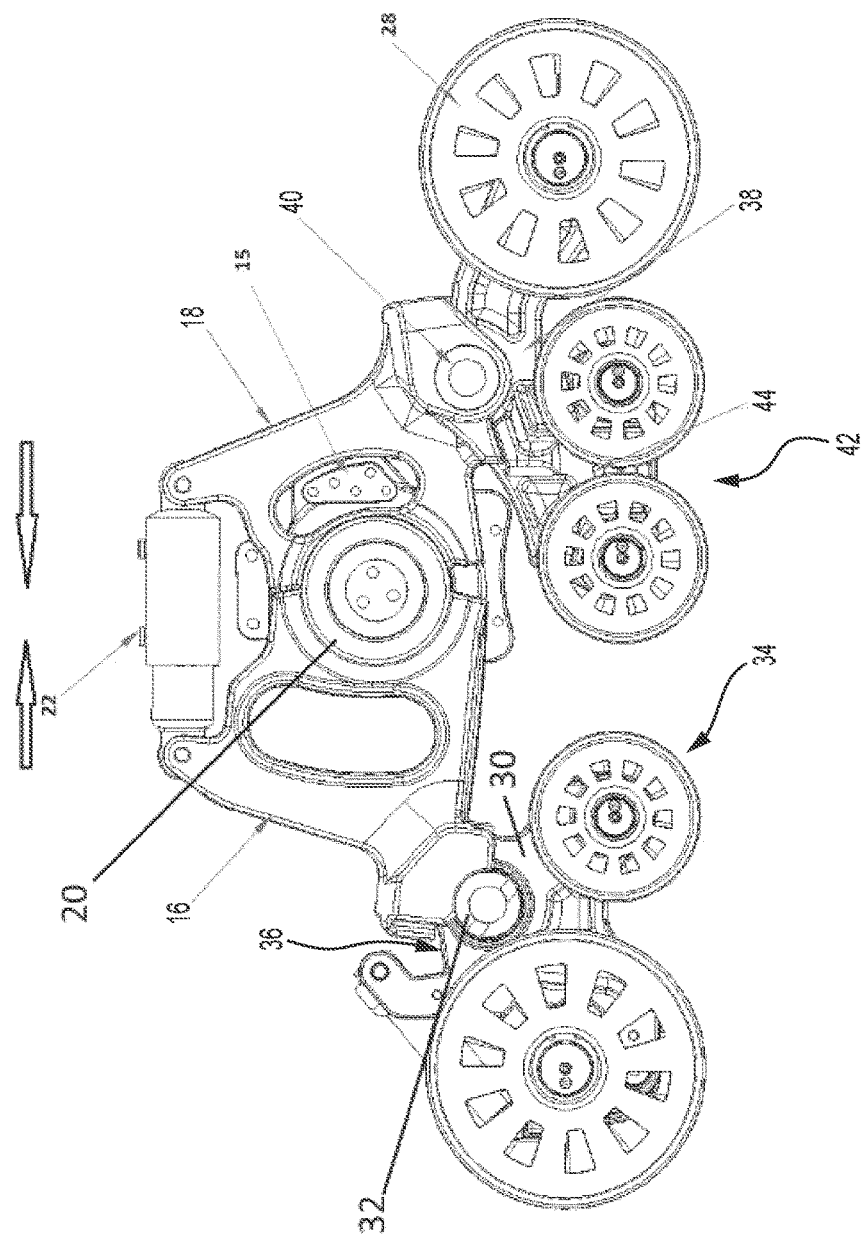
FIG. 11 is a side view of a track assembly in accordance with the principles of the present invention having the sprocket wheel and the track band removed showed in a compressed status.
Figure 12:
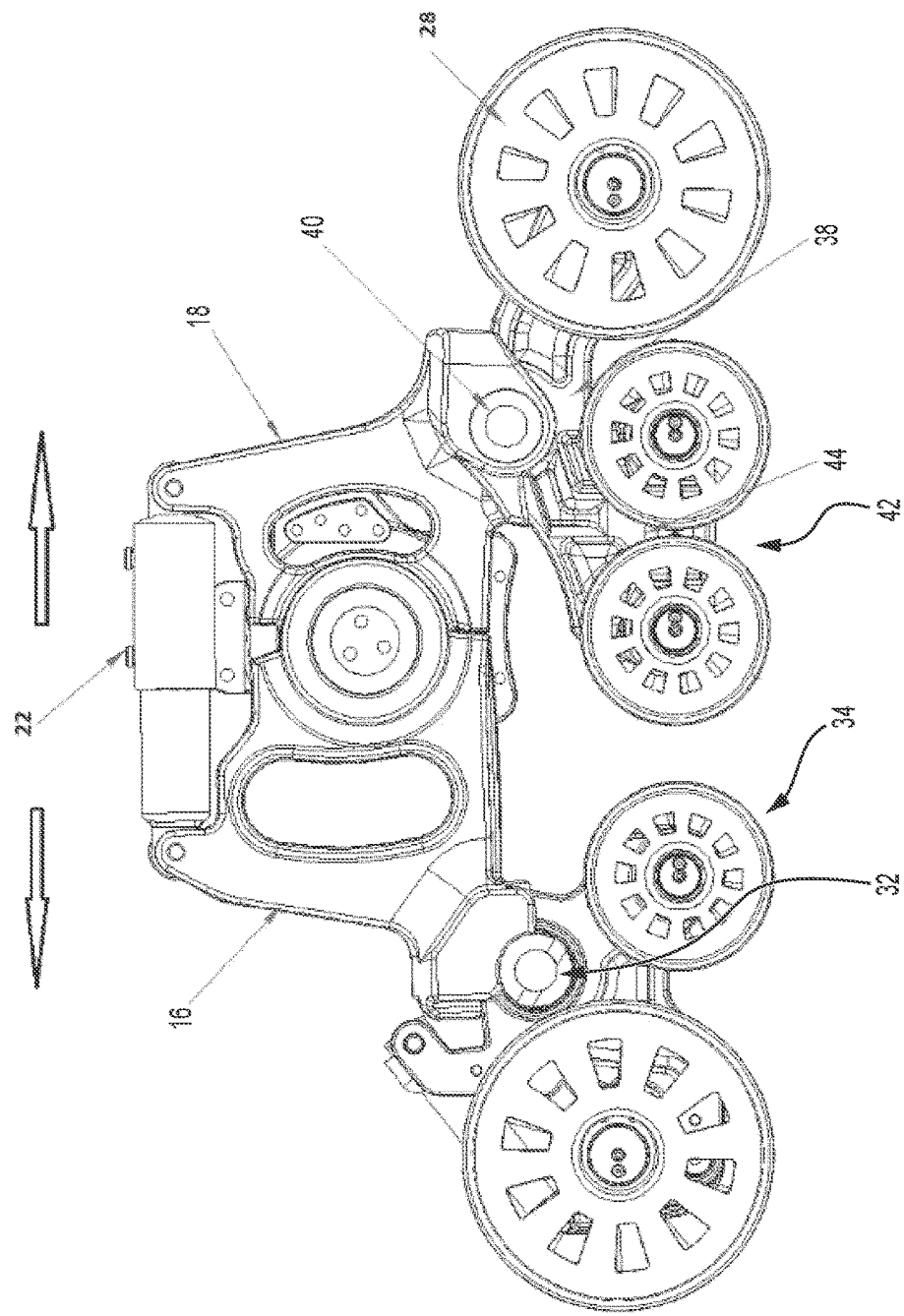
FIGS. 12 and 13 are side views of a track assembly in accordance with the principles of the present invention having the sprocket wheel and the track band removed showed in an extended status.
Figure 13:
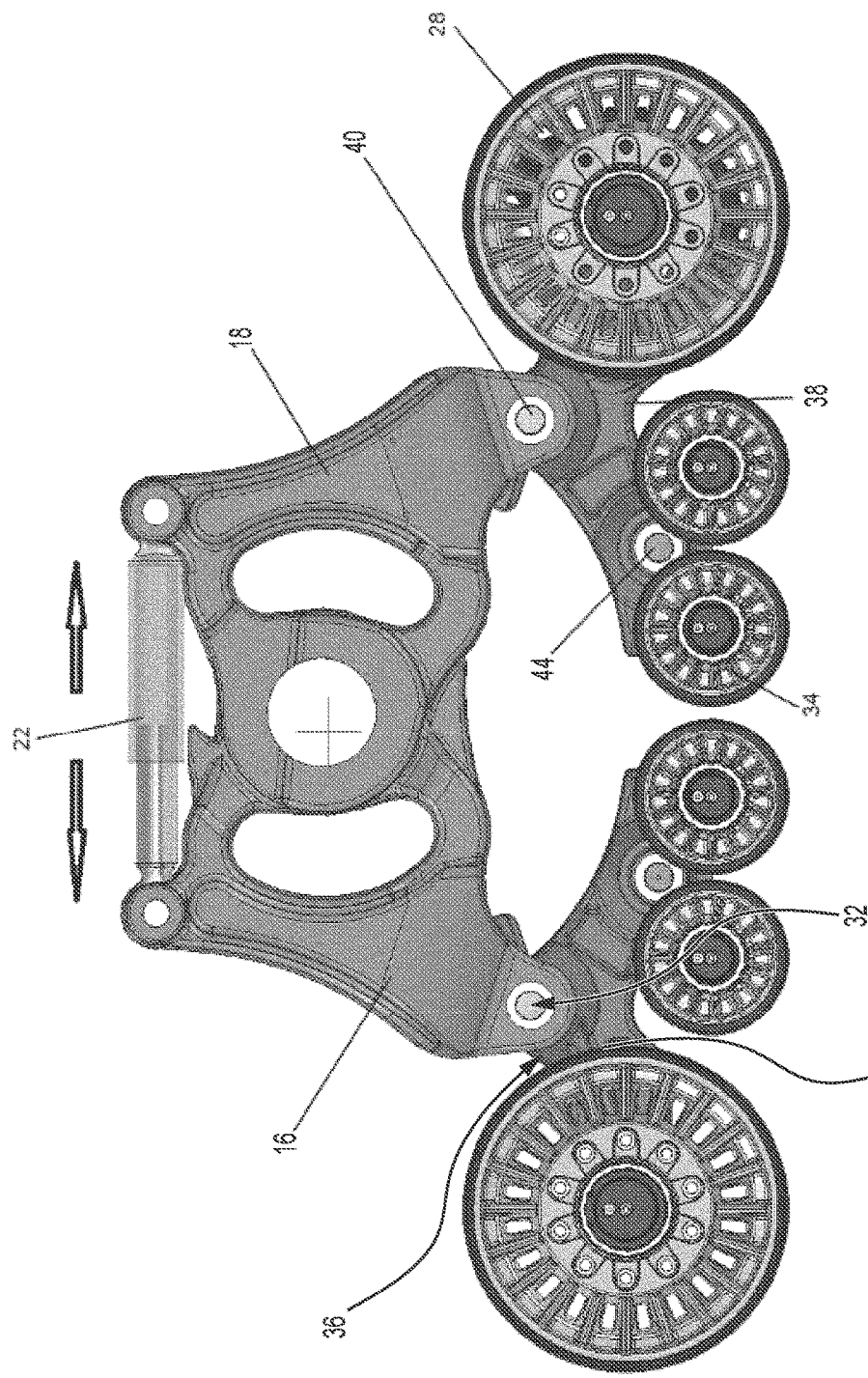

Each split frame portion 16 or 18 may further comprises a lower portion typically being proximal with the track band and adapted to mount an idler wheel 28 or to pivotally mount a tandem assembly 42 (as shown, as an example, on FIGS. 11-13).

Now referring to FIG. 7, the resulting support frame pivot 20 is formed by the superposition mounting of the aperture 74 of each split frame 16 and 18. In the present embodiment, the second portion 18 comprises two structures member, each comprising an aperture 74, both apertures 74 being substantially aligned with respect to an axis. The first portion 16 comprises a single structure wherein the said structure comprises an aperture 74 configured to be inserted within the two structures of the second portion 18.

Figure 9:
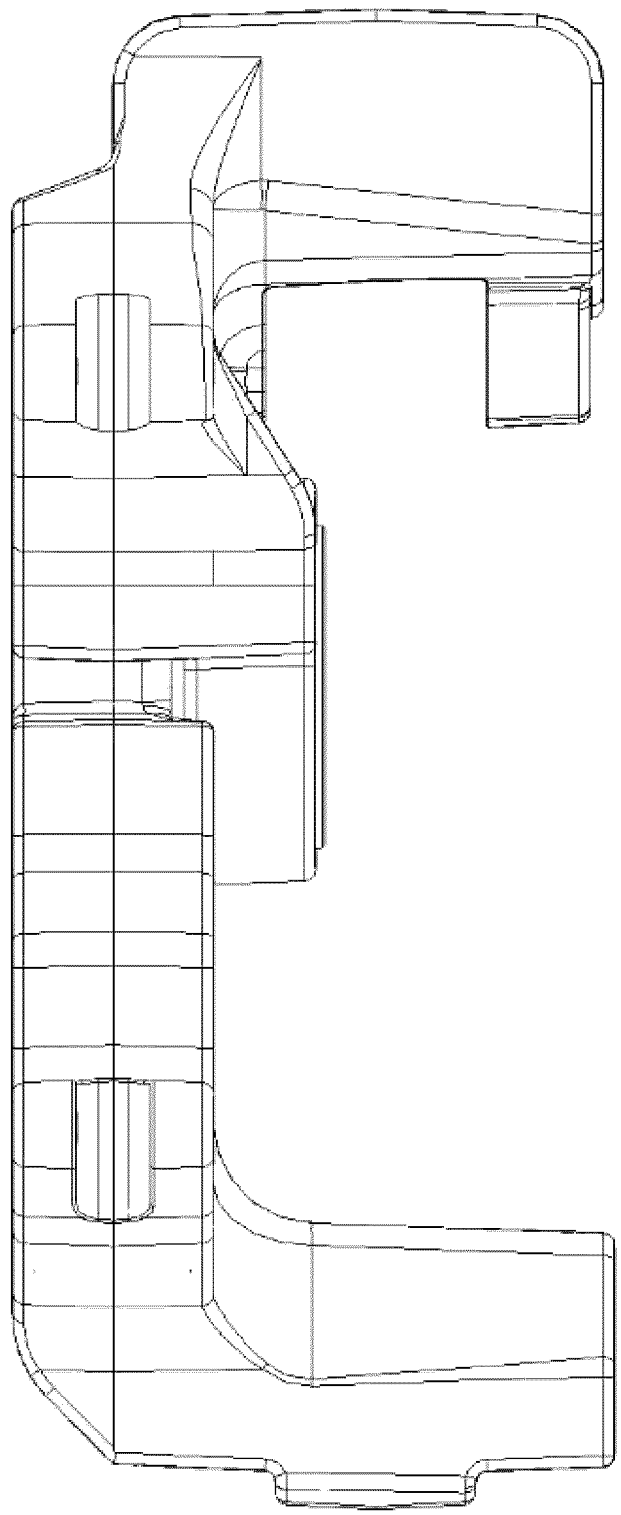
FIG. 9 is a top view of two detached portions of a track assembly formed by the superposition mounting of the aperture of each portion in accordance with the principles of the present invention.
Figure 10:
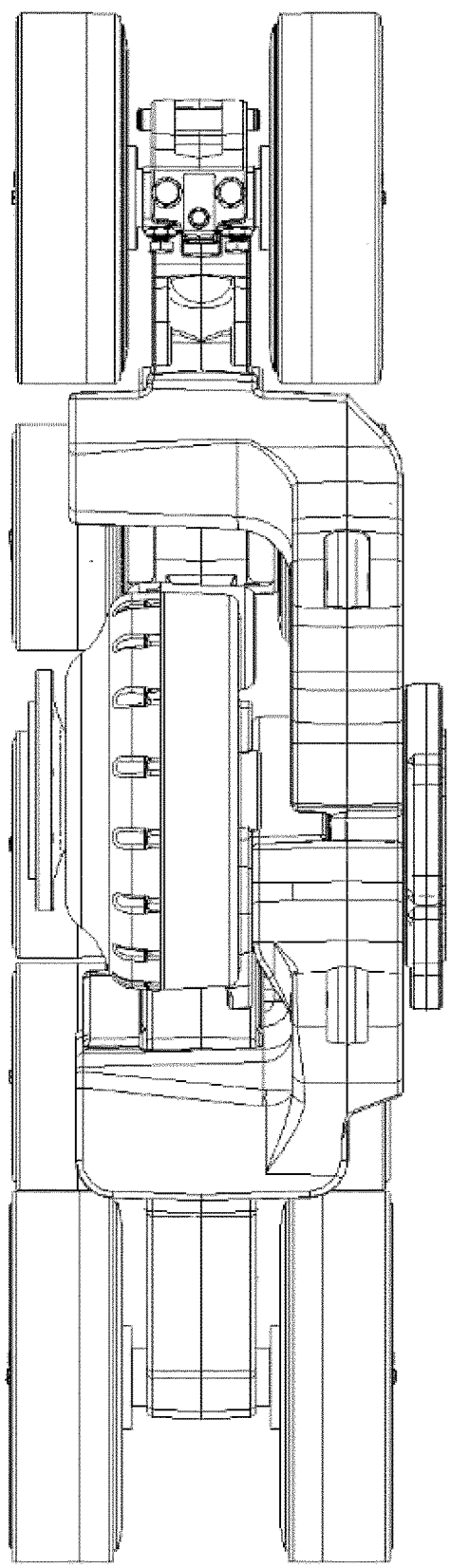
FIG. 10 is a top view of two detached portions of a track assembly formed by the superposition mounting of the aperture of each portion shown with sprocket, idler and support wheels.

Now referring to FIGS. 8 to 10, another embodiment showing the resulting support frame pivot 20 being formed by the superposition of single aperture 74 structure is shown.

In the present embodiment, the first and second portions 18 each comprises a single structure member, each comprising an aperture 74, both apertures 74 being substantially aligned with respect to an axis.

One skilled in the art shall understand that the present invention is not limited to the embodiments shown in FIGS. 6 to 10 and that any other mean to the superposition of two pivoting portions 16 and 18 as a resulting pivot point 20 may be used.

Now referring to FIGS. 11 to 13, an exemplary embodiment of a track system 1 having 3 or 4 sets of support wheels 34 and a split support frame 16 and 18 is shown. In such an embodiment, a first secondary pivoting assembly 36 is pivotally connected to the support frame of the track system 1, thereby allowing the track system 1 to undergo deformation as the vehicle gets on uneven terrains. The first secondary pivoting assembly 36 typically comprises a first secondary pivoting structure 30 pivotally connected to the support frame 16 via the pivot 32, a rotative coupling of the first pivoting structure 30 to a first idler wheel 28, and a rotative coupling of the support wheels 34 to the first secondary pivoting structure 30.

The track system 1 may further comprise a second secondary pivoting assembly 38 pivotally connected to the support frame 18 of the track system 1 via the pivot 40. Such second secondary pivoting assembly 38 is typically configured as a mirror of the first secondary pivoting assembly 36. As shown in FIG. 11, in an embodiment, the second secondary pivoting assembly 38 may comprises support wheels 34 pivotally mounted in tandem on a second pivoting structure and pivoting about a support wheel pivot 44.

In other embodiment, as exemplified in FIG. 13, the support frame 16/18, such as a unitary support frame (not shown) may comprise a first and a second secondary pivoting assemblies 36, 38 each pivoting with respect to the first and second ends of the support frame. Such an embodiment aims at evenly balancing the load of the axle between the front end and the rear end of the track system 1. In further embodiments, uneven configuration may be used to adapt to specific load balance. In such embodiments, the length and/or number of support wheels set may use any configuration. As an example, the first secondary pivoting assembly 36 may comprise one set of idler wheels and one set of support wheels while the second secondary pivoting assembly 38 may comprise a set of idler wheels and two set of idlers wheels. Such configuration may provide better load balance in some conditions.

In yet other embodiments, as exemplified in FIG. 13, the support frame may comprise a first portion 16 connected to a second portion 18 using a single pivot point 20 and suspension system 22. In such embodiments, each portion 16/18 may be pivotally connected to a secondary pivoting assembly 36/38.

In embodiments comprising secondary pivoting assemblies 36/38, as exemplified in FIGS. 11-13, the support frame or portions of the support frame 16/18 are configured to adapt with respect to the terrain and/or the load of the vehicle. Accordingly, the different elements of the track system 1 may varied to absorb vibrations and ground forces, such as the general angles of the portions of the support frame 16 and 18 with respect to each other, the angles of the tandem assemblies 42 with respect to the attached secondary pivoting assembly, the position of the pivots 32 and 40 with respect to the main pivot 20, the configuration of the suspension or damper system 22, the angle of the support wheel assembly (not tagged) with respect to the secondary pivoting assembly 36, 38 for instance, etc.

Now referring the FIG. 11, the track system 1 is shown in position where the suspension system 22 is compressed, thus the central pivot point 20 moves toward to the ground and to the first and second idler wheels when compared to the rest position. When being compressed, the suspension system 22 restores the default position (see FIG. 1A-B, 2, 3A-B and 4 to 5) of both pivoting portions 16 and 18.

Now referring the FIGS. 12 and/or 13, the track system 1 is shown in position where the suspension system 22 is extended or uncompressed, thus the central pivot point 20 moves away from the ground and from the first and second idler wheels 28 compared to the rest position (see for instance FIGS. 1A-B, 2, 3A-B and 4 to 5). After being extended, the suspension system 22 restores to its rest position thus both portions 16 and 18 are forced to pivot them with respect to the support frame pivot 20.

Figure 14:
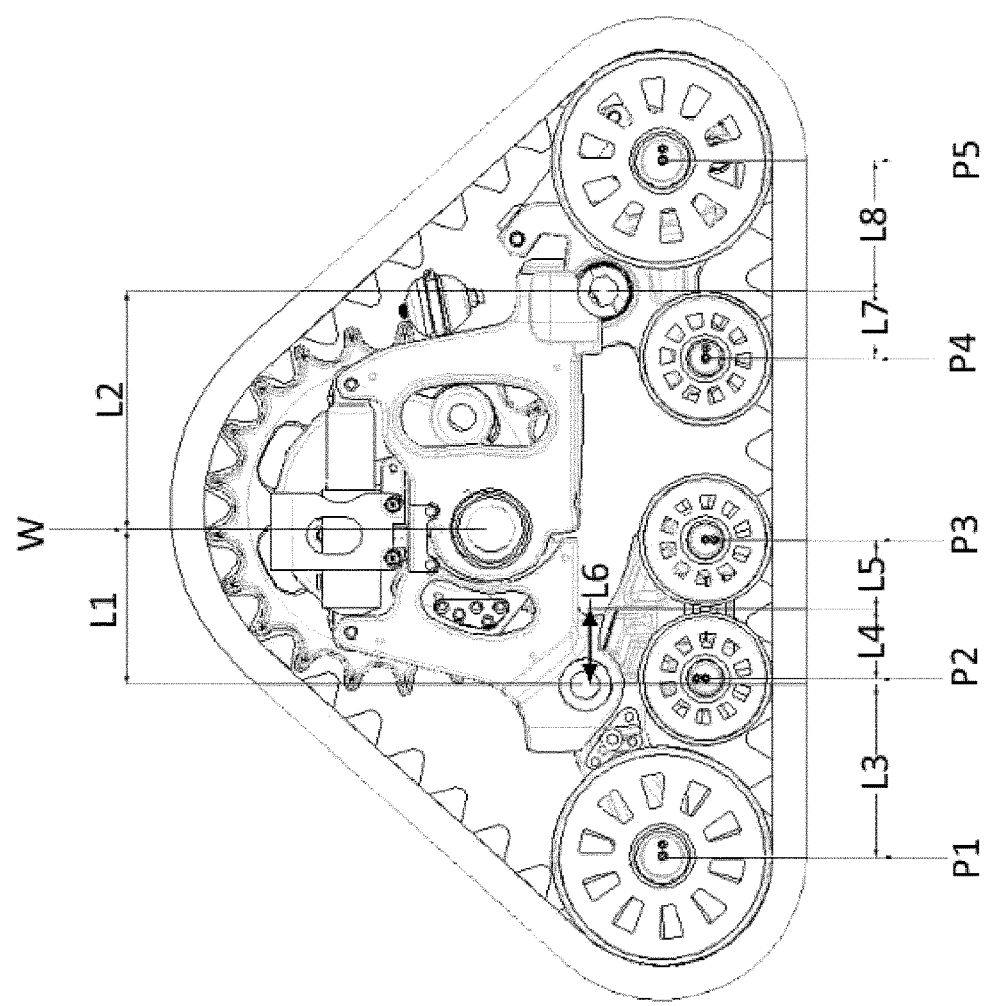
FIG. 14 is a side view of a track assembly comprising three sets of support wheels in accordance with the principles of the present invention showing the resulting forces on the wheels of the track system.

Now referring to FIG. 14, an embodiment having asymmetric support wheels sets, such as 2 sets of support wheels on a first portion and 1 set of support wheels on a second portion is shown. FIG. 14 shows the pressure (Force/Area) or load (F) applies on each wheel (P1 to P5). In a preferred embodiment, the P1=P2=P3=P4=P5. To obtain such equilibrium, the force on boom L1 shall be higher than the force sustained by L2. Thus, the length of L2 is greater than the length of L1.

As an example, in a context where the load under each wheel axle shall be optimized and/or equal, for an embodiment having 5 sets of wheels as shown in FIG. 14, the length of the lever arms may be calculated using the following equations:

$$P_2 \times L_4 = P_3 \times L_5$$

where $P_2 = P_3$, thus $$P_2 \times L_4 = P_3 \times L_5$$

$$L_4 = L_5 \quad (1)$$

$$P_1 \times L_3 = P_2 \times L_6 + P_1 \times L_6$$

where $P_1 = P_2 = P_3$, thus $$P_1 \times L_3 = 2 P_1 \times L_6$$

$$L_3 = 2 L_6 \quad (2)$$

$$P_2 \times L_7 = P_5 \times L_8$$

where $P_4 = P_5$, thus $$L_7 = L_8 \quad (3)$$

$$P_1 \times L_1 + P_2 \times L_1 + P_3 \times L_1 = P_4 \times L_2 + P_5 \times L_2$$

where $P_1 = P_2 = P_3 = P_4 = P_5$, thus $$3 P_1 \times L_1 = 2 P_1 \times L_2 \quad (4)$$

$$L_1 = \frac{2}{3} L_2$$

The same principle may be applied to any other booms or lever arms s to determine the length of the different boom for a required load on each axle.

In other configurations, it may be desirable to obtain a configuration where each axle may support equal pressures applied on the ground or on the track, thus the effective contact area ($A_n$) of each axle and the length of the lever arms ($L_n$) must be adapted accordingly. As an example, the following equations may be used to calculated effective contact area of each axle and the length of the lever arms:

$$P_4 = \frac{F_4}{A_4} = P_5 = \frac{F_5}{A_5}$$

knowing $A_4$ and $A_5$ as wheel contact area $$F_4 = F_5 \times \frac{A_4}{A_5} \quad (1)$$

$$F_4 \times L_7 = F_5 \times L_8$$

$$F_5 \times \frac{A_4}{A_5} \times L_7 = F_5 \times L_8 \quad (2)$$

$$L_8 = \frac{A_4}{A_5} \times L_7$$

Understandably, other lengths of lever arms ($L_n$) and/or effective contact area ($A_n$) may be calculated using equations following the same principles.

In other embodiments, the $1^{st}$ set of support wheels (P4) has slightly more load than $2^{nd}$ and $3^{rd}$ set of support wheels (P3 and P2). Such configuration allows the load to be reduced on the front idler (P5) in order to minimize track wear.

Now referring to FIGS. 15 to 20, a portion 16 of an embodiment of a track system 1 having a secondary pivoting assembly is shown in different positions. The present embodiment comprises a 3-link suspension wherein the 3-link suspension comprises a pivot 161 mounted to the support frame or split frame portion, a suspension/damper system 162 between the pivot and the tandem structure, a link member 163 between the pivot 161 and the idler wheel 164. Such suspension system allows the adaptation of the distance between the supporting wheels and/or idler wheels and the support frame/split frame portion 16 or 18. The suspension system is typically embodied as a cylinder comprising a combination of a spring and/or a shock absorber. Accordingly, the 3-link suspension allows the absorption of some or all the vibrations causes by the load or the force from the ground due to uneven terrain.

Still referring to FIGS. 15 to 20, the angle defined by the link member 163 and the member linking the idler wheel 164 to the support wheels 165 is variable. Such angular movement is limited by the suspension/damper system 162. The assembly comprising the support wheels 165, the idler wheel 164, the suspension/damper system 162, and both link members is able to rotate about the pivot point 161.

Figure 15:
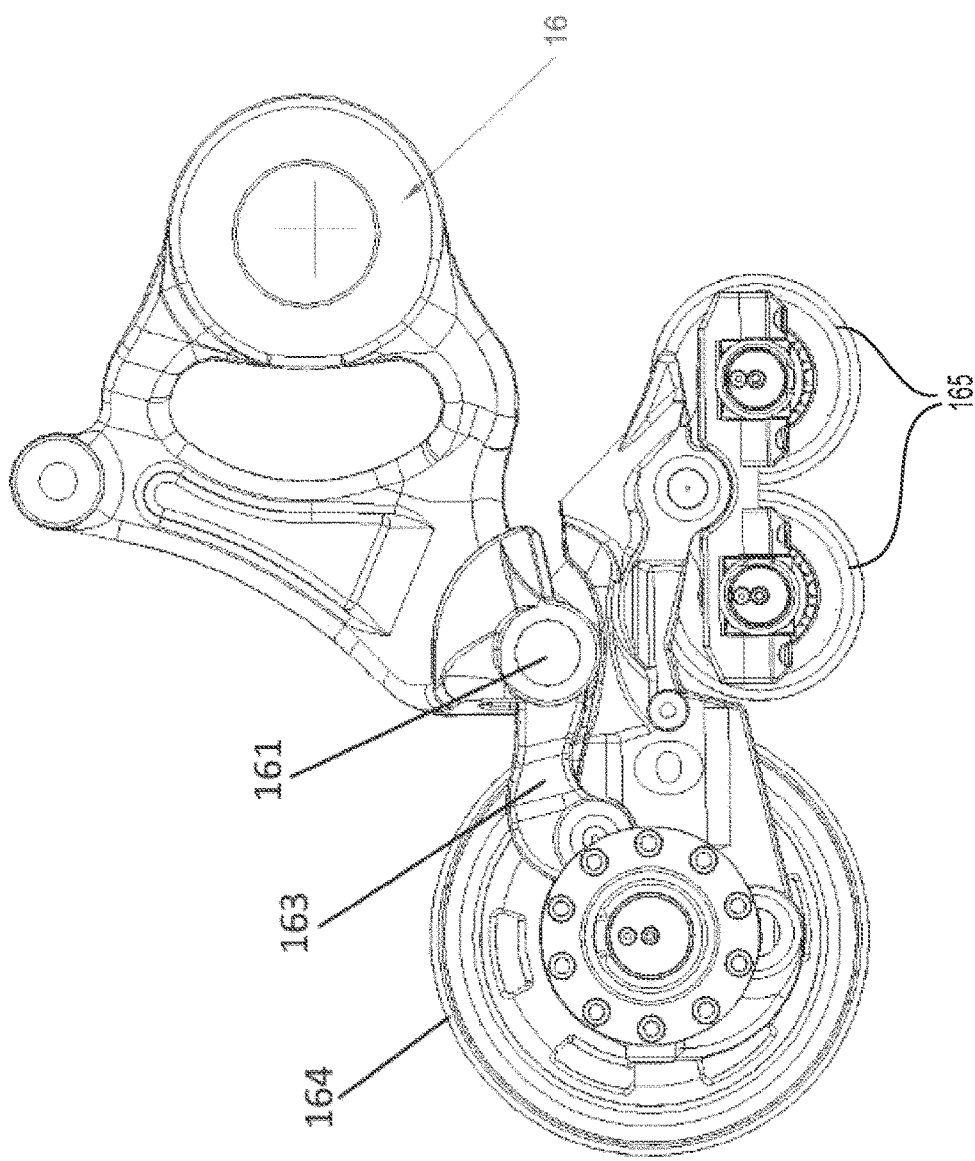
FIGS. 15 to 20 show side views of 3-link suspension system in accordance with the principles of the present invention being position in reaction to various conditions.
Figure 16:
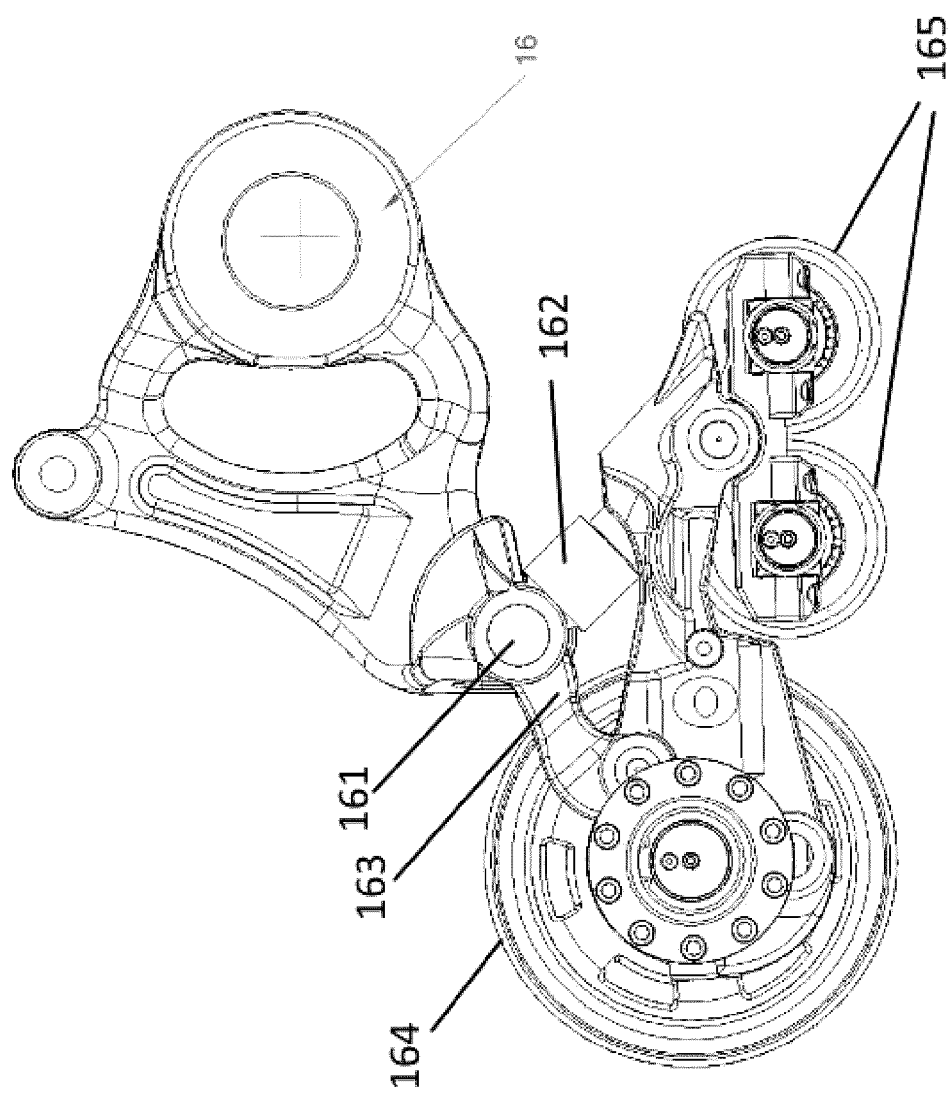

Now referring to FIGS. 15 and 16, the 3-link suspension component is being compressed (FIG. 15) or depressed (FIG. 16) to respond to load or unloading conditions.

Figure 17:
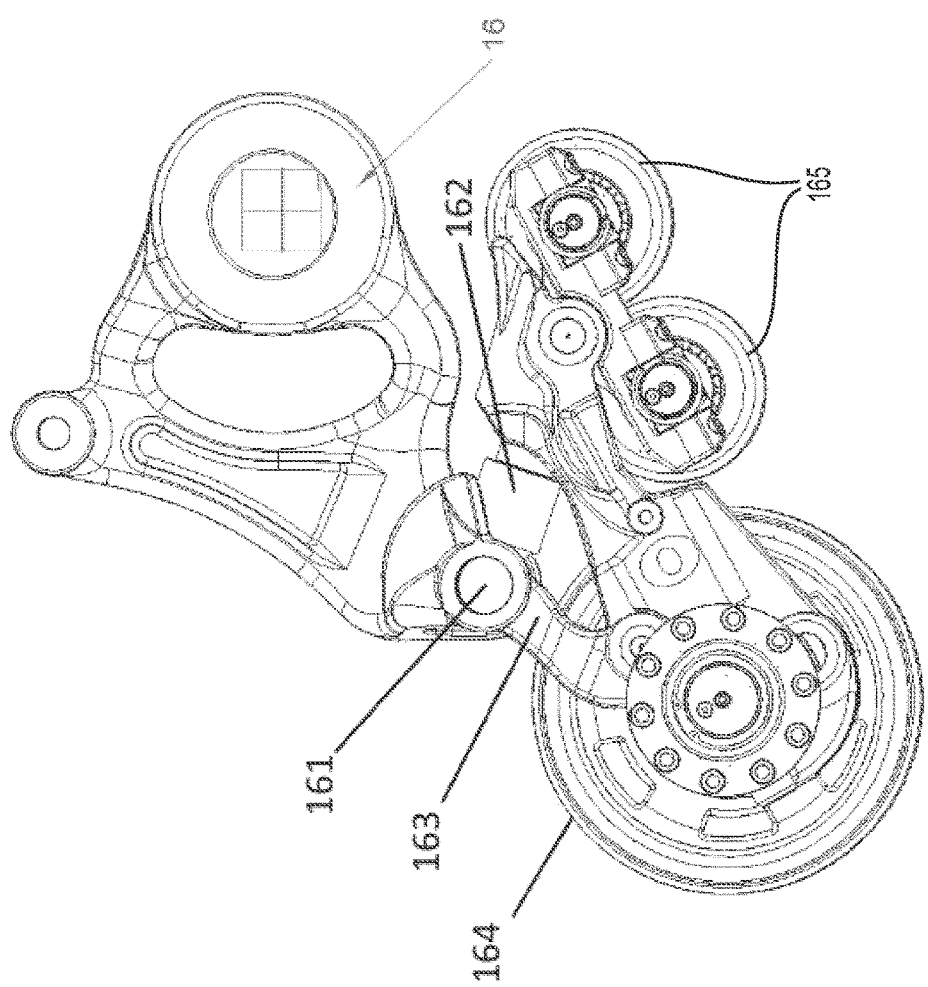
Figure 18:
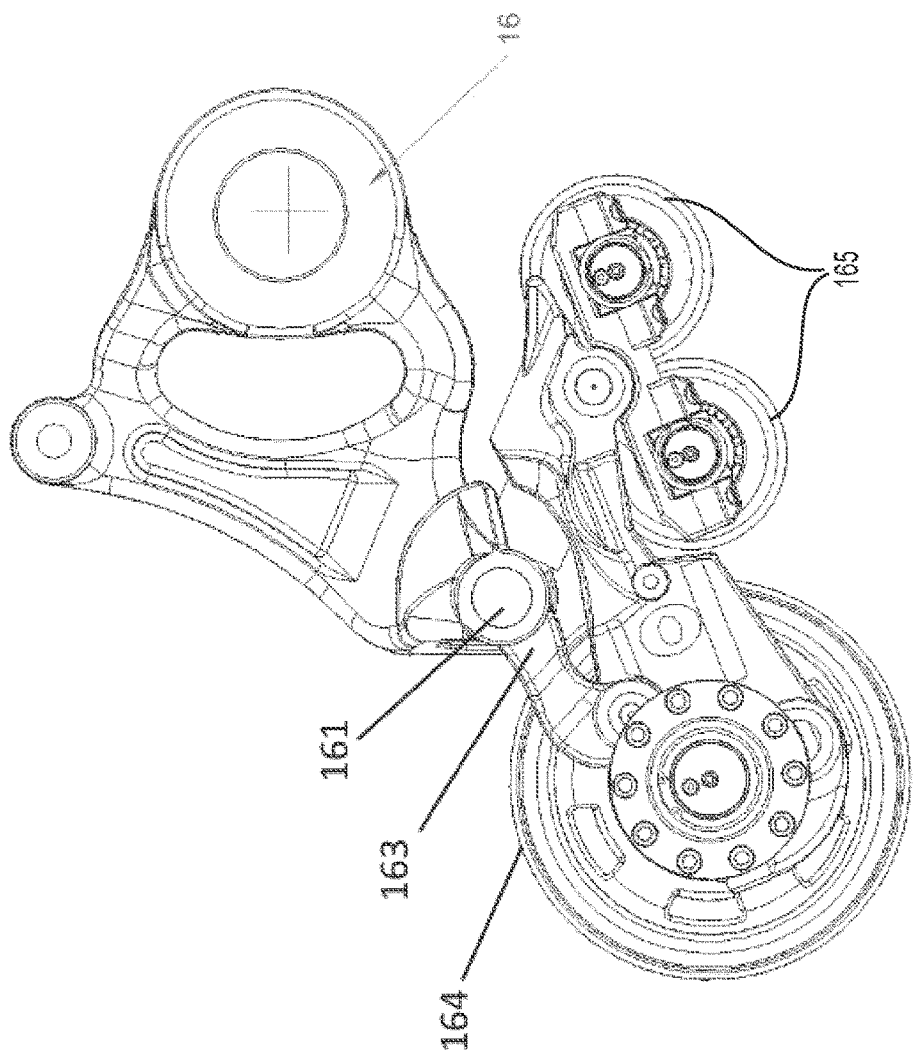
Figure 19:
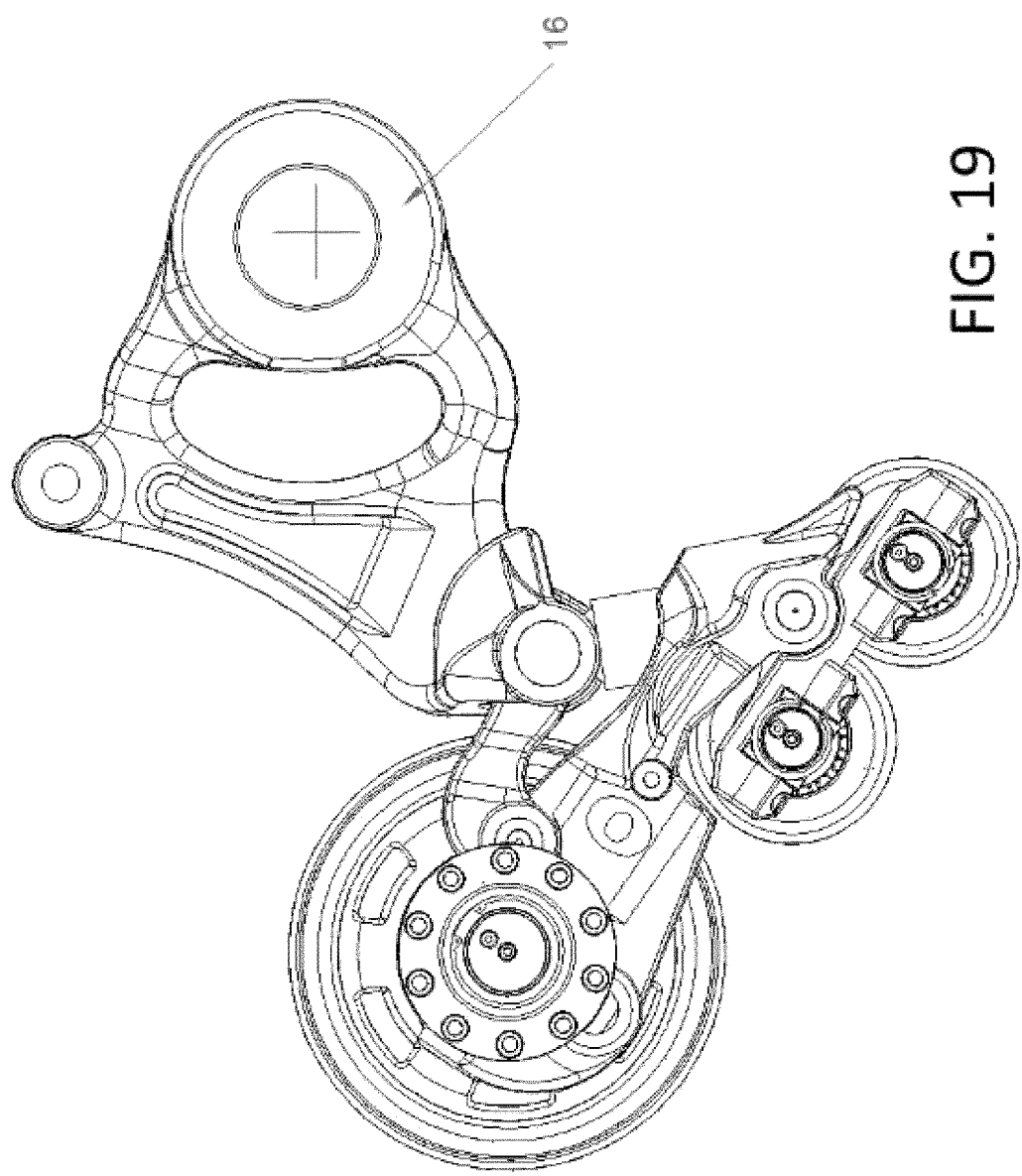
Figure 20:
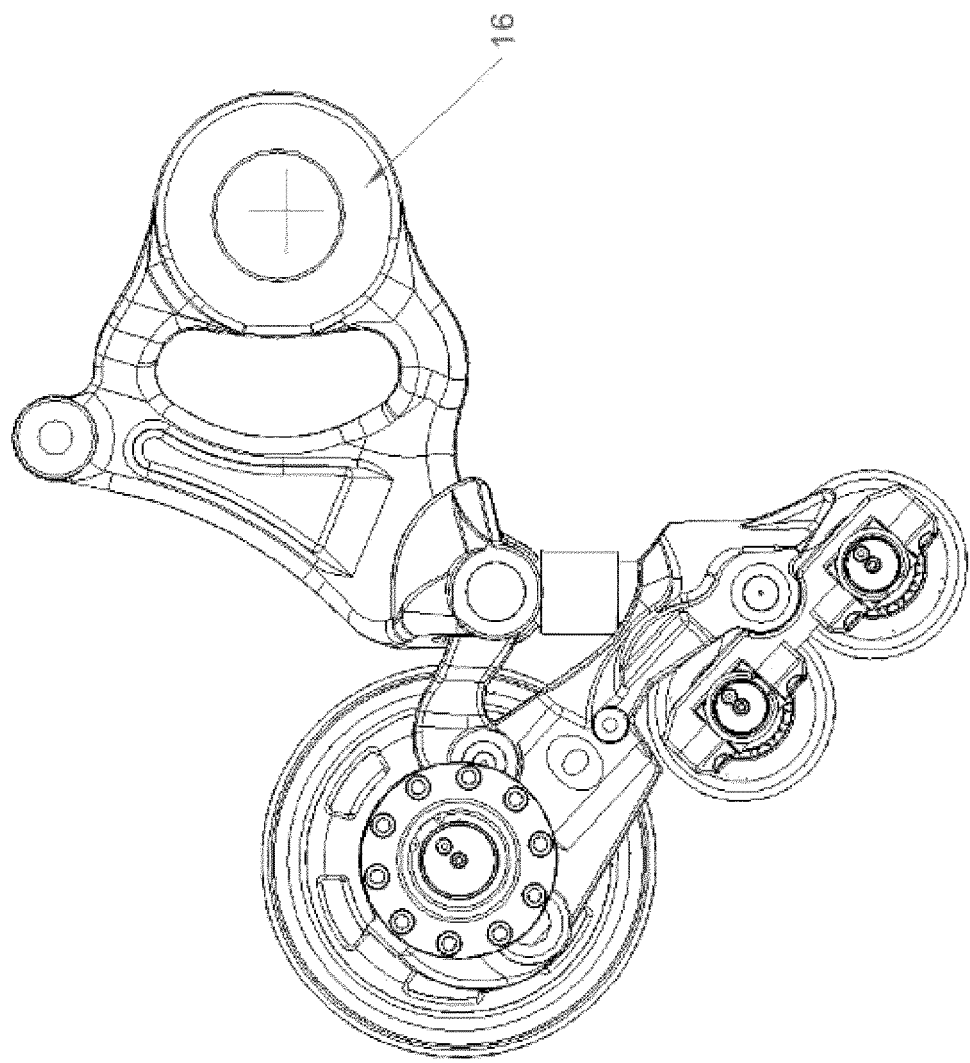
Figure 21:
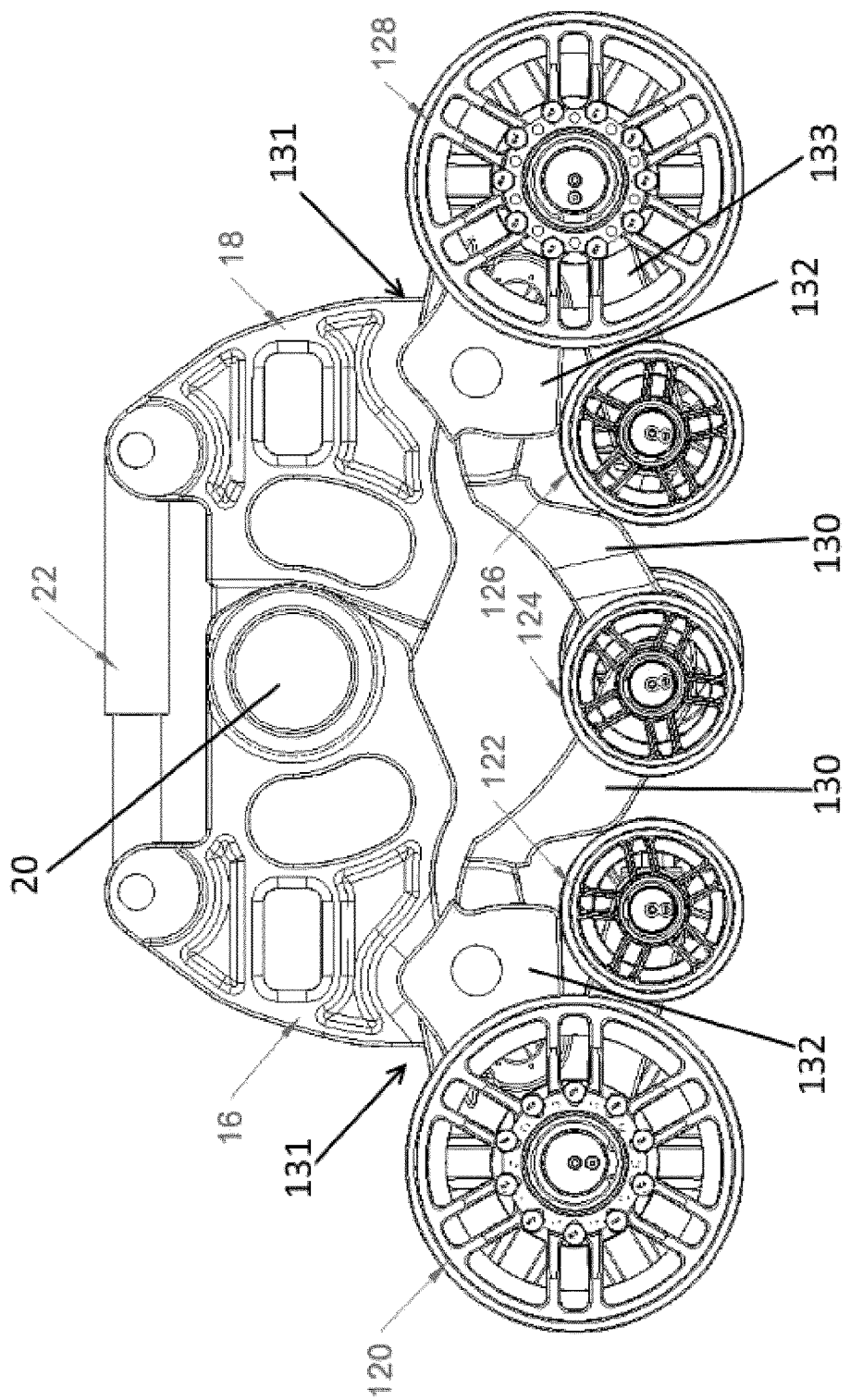
FIGS. 21 to 23 are side views of an embodiment of a track assembly in accordance with the principles of the present invention wherein the central position feature two unconnected support wheels overlapping in front of the other, the figures showing different positions of the track assembly.

Now referring to FIGS. 17 to 20, the suspension component is shown as responding to uneven terrain under either the idler wheel 164 or the supporting wheels 165, resulting in the secondary pivoting assemblies to be rotated clockwise (FIGS. 19-20) or counter clockwise (FIGS. 17-18).

Now referring to FIGS. 21 to 23, 24A to 24C and 25A to 25B, an embodiment of a track system 1 comprising three sets of supporting wheels 122, 124 and 126 in accordance with the principles of the present invention is shown. The track system 1 comprises a first tandem assembly 131 and a second tandem assembly 132 each mounted to the support frame 16/19. Each tandem assembly 131/132 typically comprises a support structure 132 pivotally mounted to the support frame 16/18. An idler wheel 120 or 128 is pivotally connected to the support structure 132. Typically, a set of wheels 122 or 126 is pivotally mounted to the support structure 132. A central wheel 124 is pivotally mounted to an extension of the support structure 130. Accordingly, when at rest, the axis of rotation of each central wheel 124 is not aligned as each wheel is longitudinally spaced apart (see FIG. 21).

In another embodiment, the track system 1 comprises a support frame have a first portion 16 and a second portion 18 wherein each portion 16 and 18 is pivotally connected using a single pivot point 20 and a suspension system 22. Thus, the position of the central wheels 124 will vary according to the pivotal movement of the frame portions 16 and 18 and to the relief of the terrain. Accordingly, two "5-wheels tridem" are created, one front "5-wheels tridem" and one rear "5-wheels tridem", as shown in FIGS. 25A and 25B.

In such embodiment, the first 131 and second 132 tandem assemblies may independently pivot with respect to each other and with respect to the main pivot axis 20. The two pivoting movements allow a longitudinal elongation of the track system 1, thus reducing the vertical displacement of the main pivot point 20 and increasing the ride comfort. The two tandem assemblies may be connected using a suspension system, as described above, to increase the ride comfort. Such suspension may be progressive. Furthermore, the first and last set of wheels 120 and 128 may be configured to pivot laterally in order to increase ride comfort.

Figure 22:
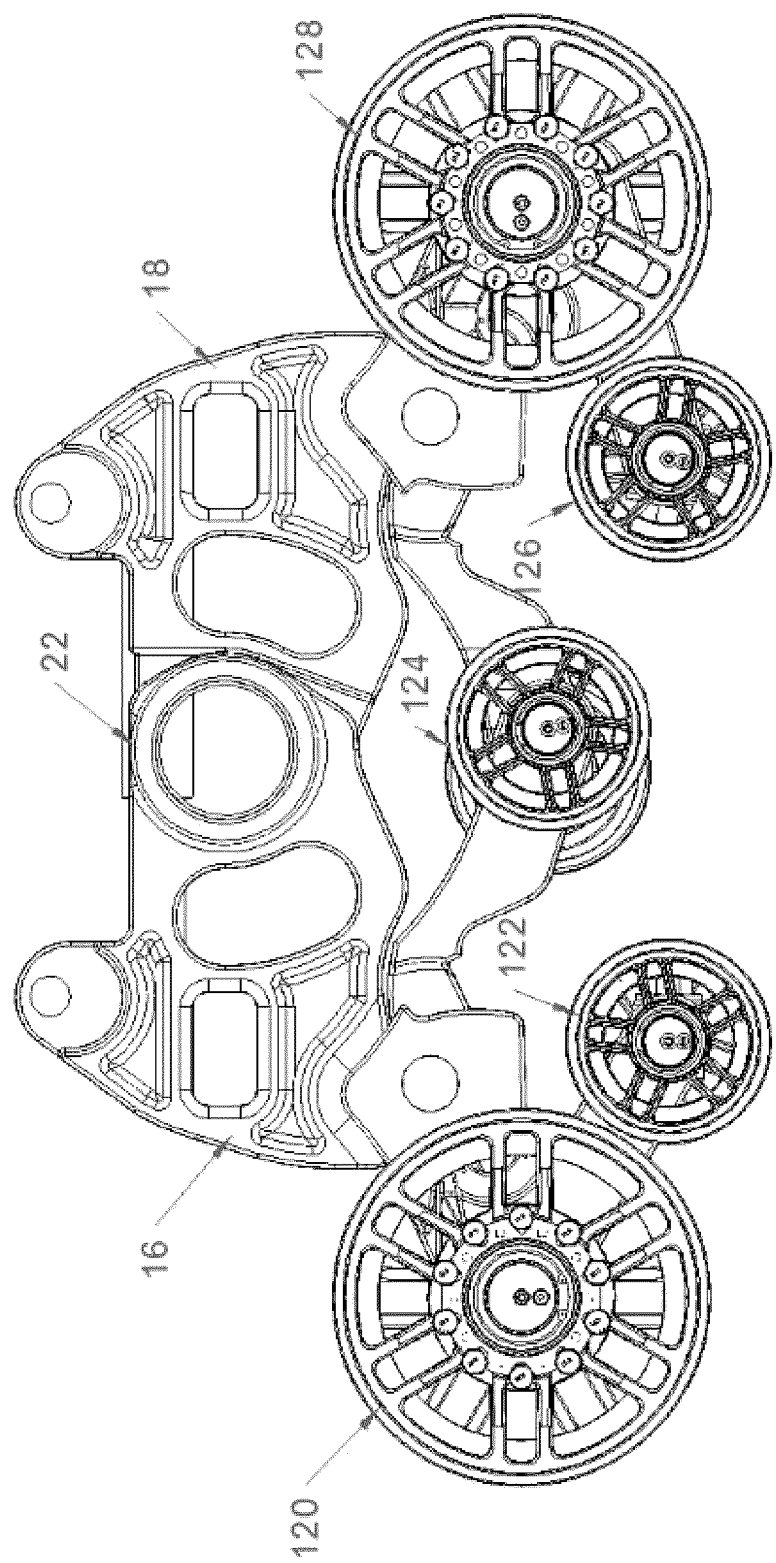

Now referring to FIG. 22, the track system is shown while the lower central portion of the track adapts to a bump and/or obstacle. In such an event, the axes of rotation of the central wheel 124 are substantially aligned.

Figure 23:
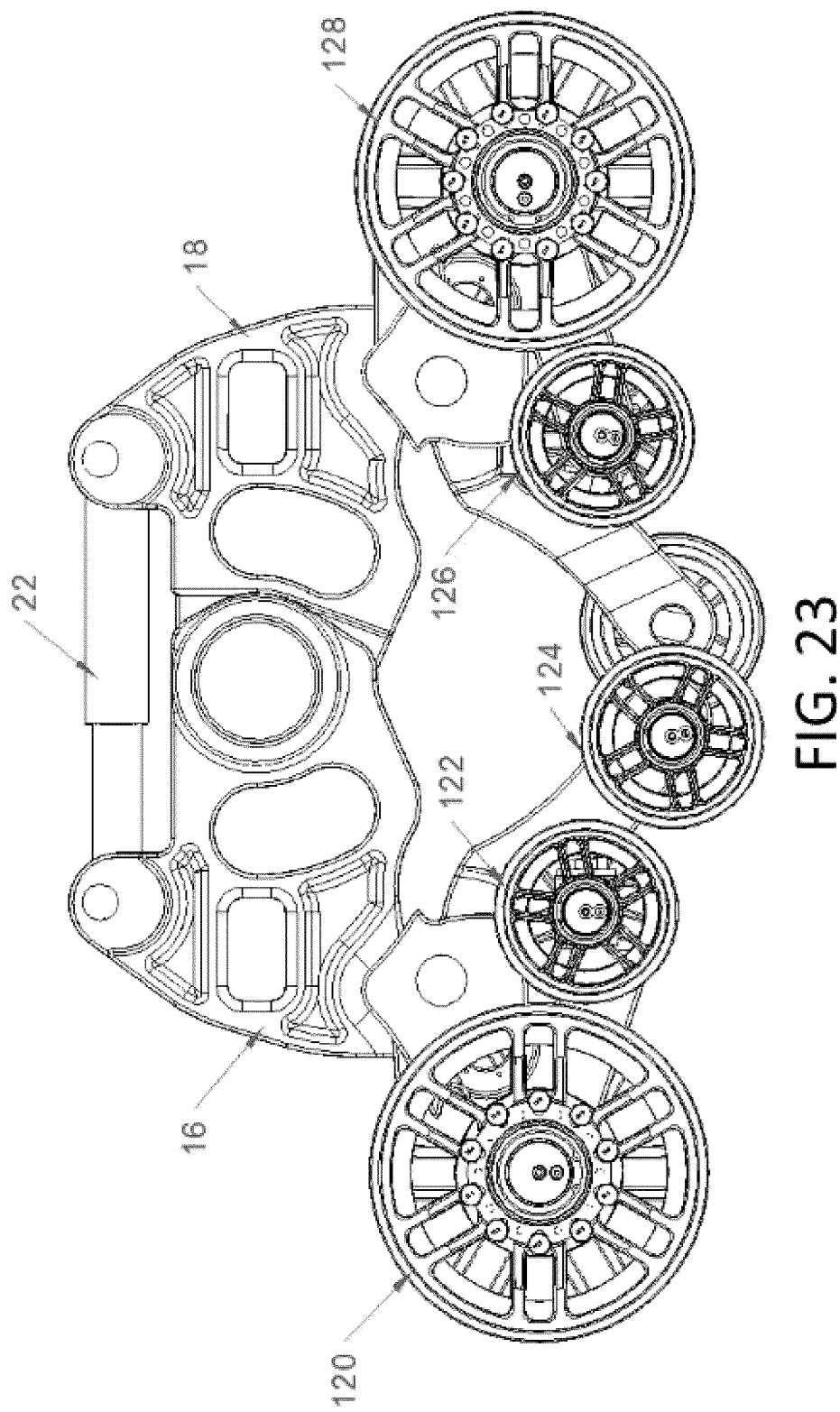

Now referring to FIG. 23, the track system is shown while the front and/or rear portions of the track adapt to a bump and/or obstacle. In such an event, the axes of rotation of the central wheels 124 are substantially spaced apart.

Figure 24A:
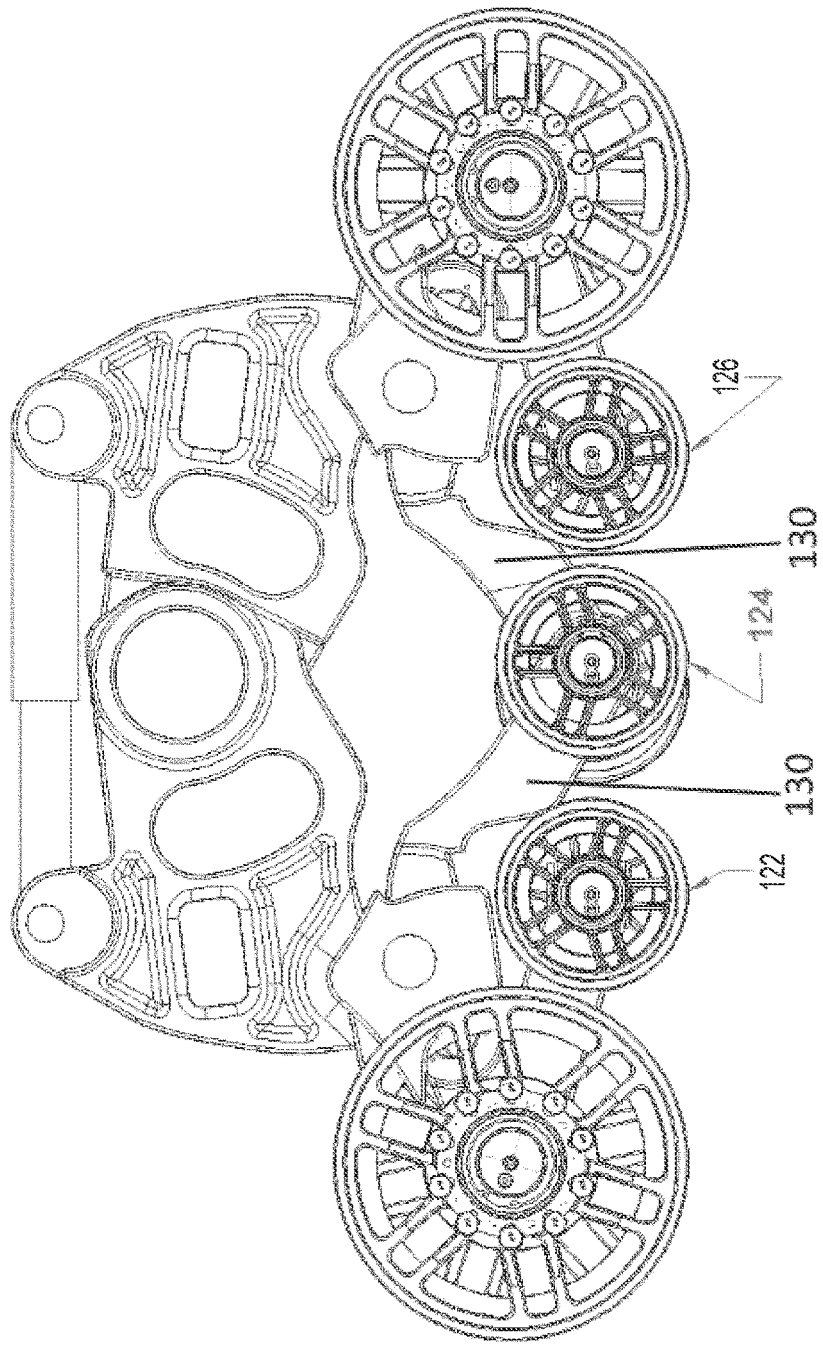
FIG. 24A to C are side views of an embodiment of a track assembly in accordance with the principles of the present invention wherein the central position feature two unconnected support wheels overlapping in front of the other, the figures showing different positions of the suspension of the track assembly reacting to different conditions.
Figure 24B:
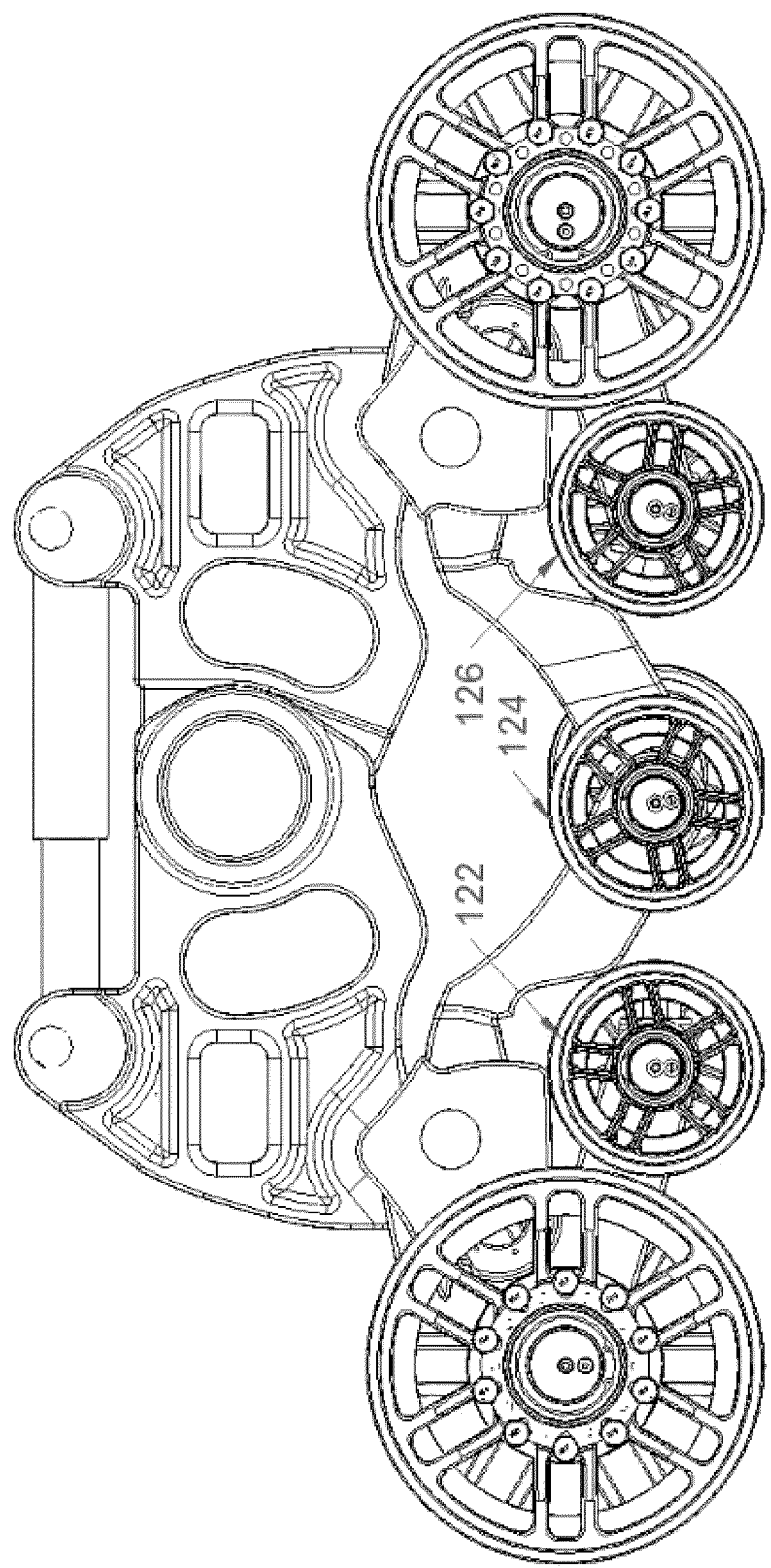
Figure 24C:
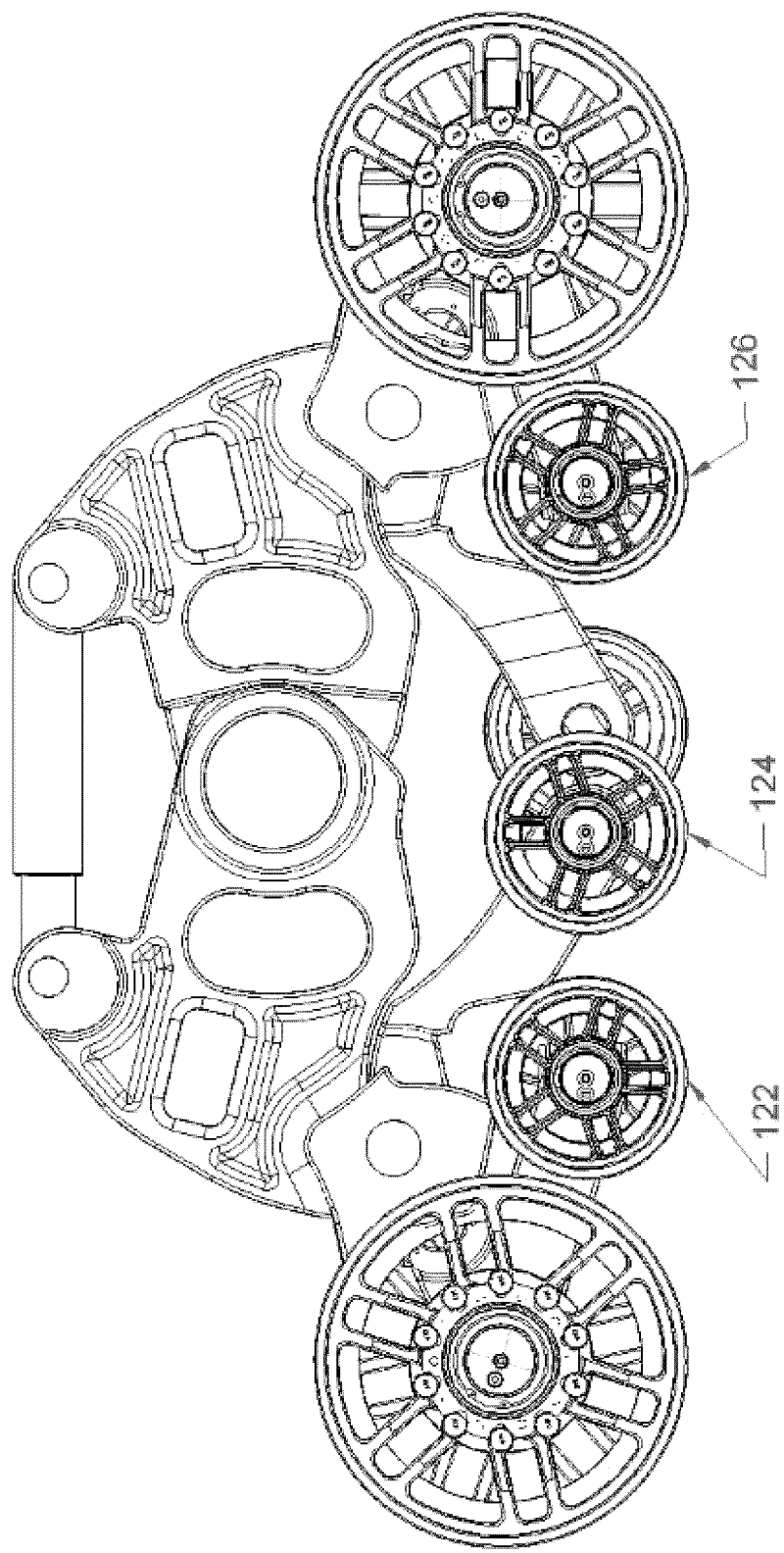

Now referring to FIGS. 24A to 24C, as illustrated, the central support wheels 124 may move upwardly (FIG. 24B-C) or downwardly (FIG. 24A). Such movements of the central support wheels 124 are attenuated by the limitation of the rotation of the extension of the support structure 130 with respect to the frame (see FIG. 24C). In embodiment having a support frame with two portions 16/18, the rotation of the support structure 132 with respect to the frame reduces the required pivotal movement of the main pivot 20, thus aiming at increasing the comfort of the operator. Understandably, other configuration may be desirable in some conditions and the axes of rotation of the central wheels 124 may be substantially aligned at rest or in any other conditions.

Still referring to FIG. 24A to C, an embodiment of a 5-wheel tridem embodiment is shown. The suspension system 22 reacts to different movements of the assemblies. For instance, when the track assembly encounters a bump whose peak is aligned with support wheels 124, the main pivot point will rotate to follow the bump shape thus causing the elongation of the suspension system 22 (see FIG. 24A). To the contrary, when the track assembly meets a depression in the ground whose deepest point is aligned with support wheels 124, the main pivot point will also rotate, but in the opposite direction, thus causing the suspension system to retract (see FIG. 24C).

In yet other embodiments, each support structure 132 may comprise multiple members such as a member extending from the idler wheel mounting emplacement allowing the mount of the set of support wheels 126. The support structure 132 may further comprises a second extending member 130 adapted to pivotally mounted a central wheel 124. Understandably, any other mean allowing the central wheels 124 to be coaxial yet not on the same axle and to allow such wheels 124 to move in reaction to the relief of the ground may be used.

Now referring to FIGS. 25A and B, top and bottom views of the wheel assembly embodied as a 5-wheel tridem are shown at different elongation positions. As illustrated in FIG. 25B, the central support wheels 124 are not part of a common axis. Furthermore, one of the central support wheels 124 is connected to the front portion of the support frame while the other central support wheel 124 is connected to the rear portion of the support frame 18, further demonstrating that the central support wheels 124 may move apart longitudinally as they are moving up and down.

Figure 26:
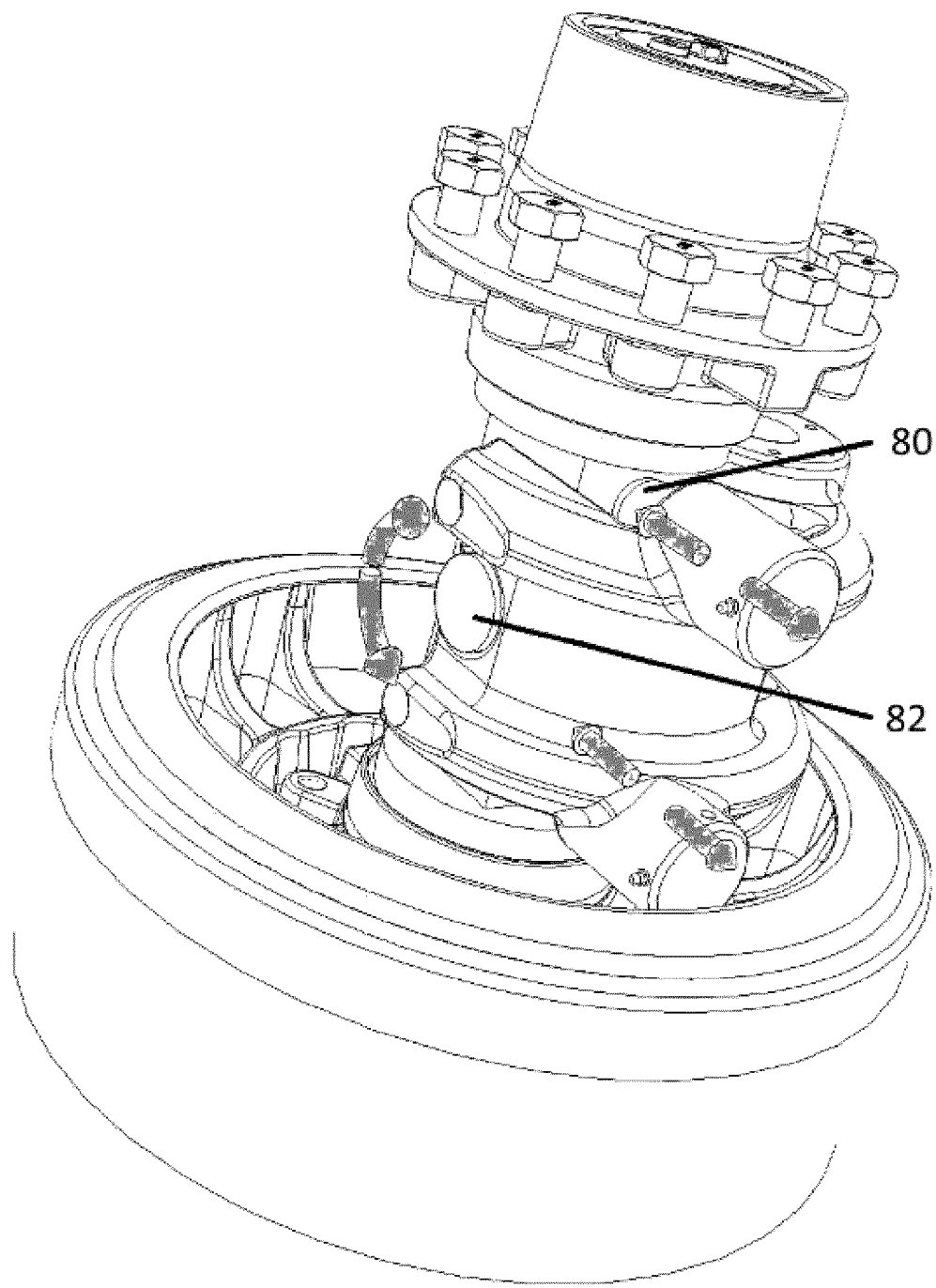
FIG. 26 is a perspective view of an embodiment of a track adjustment system having two hydraulic pressuring systems.
Figure 27:
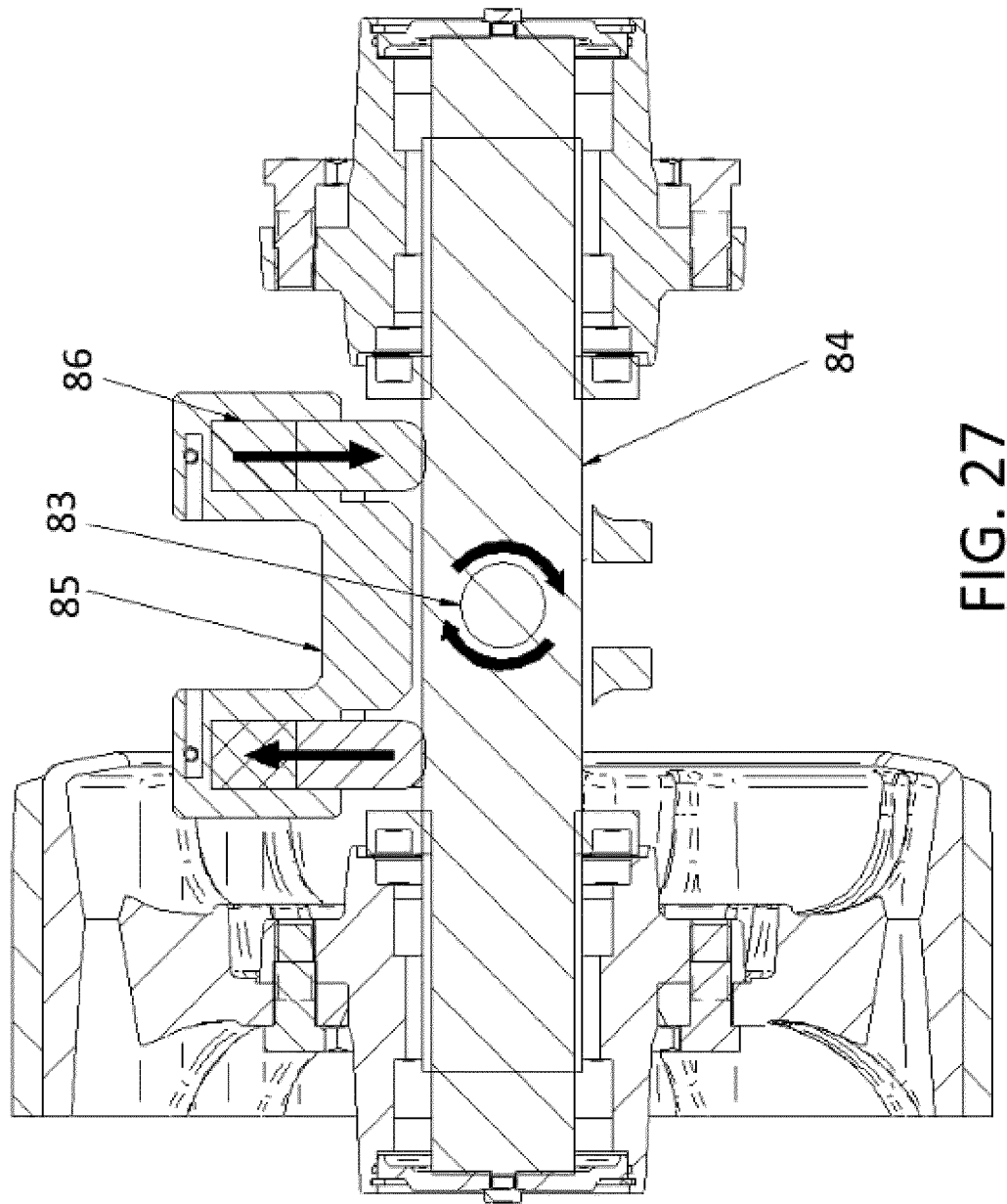
FIG. 27 is a top section view of the track adjustment system of FIG. 26.
Figure 30:
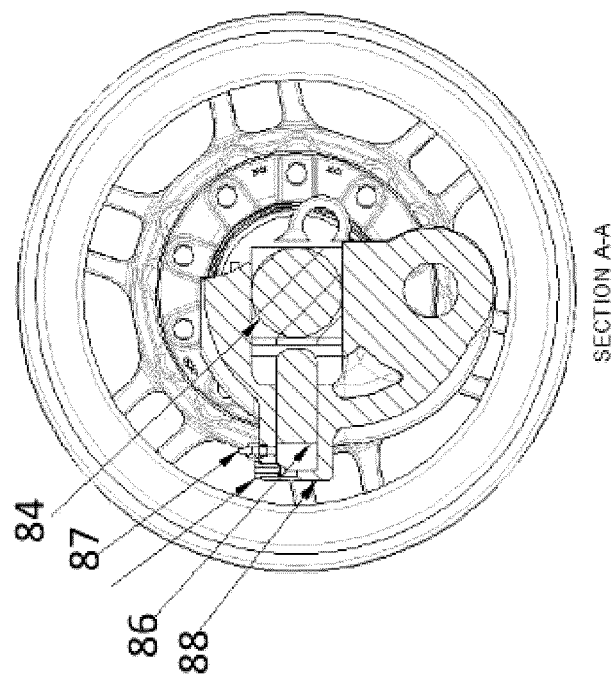
FIG. 30 is a side section view of the track adjustment system of FIG. 26.
Figure 29:
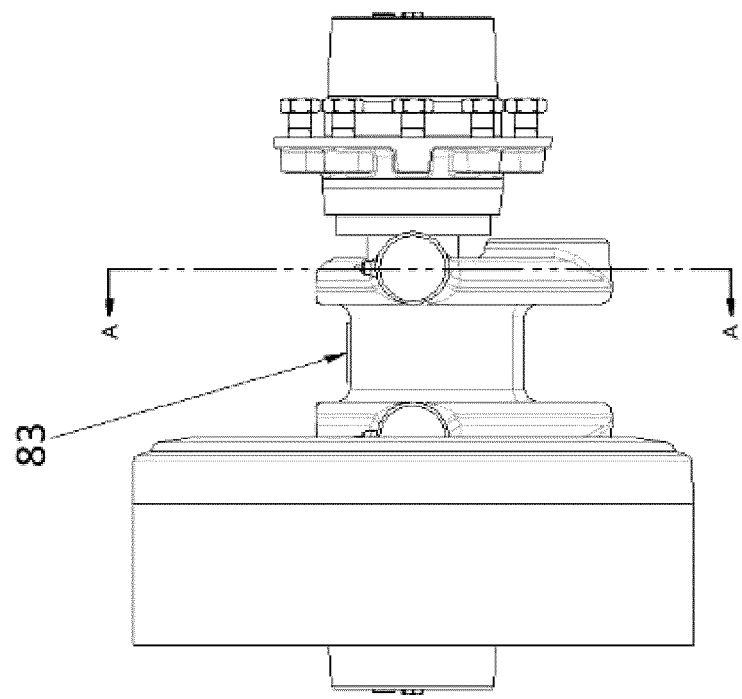
FIG. 29 is a plan rear view of the track adjustment system of FIG. 26.

Now referring to FIG. 26, a close up of the assembly of a set of wheels, such as idler wheels or support wheels is shown. The illustration provides a view of a set of wheels, such as a set of idler or support wheels, (one wheel is not shown in the FIG. 26)

Referring to FIG. 26, in a further embodiment, a track system 1 may comprise a tracking adjustment system using more than one pressuring system 50, such as a grease or oil containers or cylinder 50, located on each side of a predetermined rotation axis 52 on the axle of a set of wheels, typically a set of idler wheels. The predetermined axis is typically substantially vertical and centered between the wheels. Understandably, in other embodiments, other axis may be used, such as a horizontal axis or not centered axis, to provide other adjustments or to vary the force required by the pressuring system. This embodiment is desirable as it allows an operator to adjust alignment of the track without having to remove one or more wheels and/or eases the maintenance by avoiding working in a confined or reduced space area. As the pressure is increased or decreased in one of the hydraulic pressuring system, the wheel to be aligned is moved in one or the other direction by the increased pressure of the pressuring system in which more oil is added.

In another embodiment, a single pressuring system may be used. The pressuring system 50 could be attached to the axle. As pressure is increased in the pressuring system 50, the axle is pivoted with respect to the axis. In such an embodiment, the axis may be centered with respect to the wheels. However, in other embodiments, the axis may be positioned anywhere between the wheels by adapting the pressure of the pressuring system 50.

The method to use the track adjustment system comprises the steps to open the hydraulic pressuring system 50, to add pressure to the system, typically by adding lubricant or oil in the pressuring system 50, to close the pressuring system 50 when the required adjustment is set. The method may further comprise to connect an input to lubricant or pressuring mean and to disconnect the input mean after adjustment.

In other embodiment, the tracking adjustment could be automatically regulated or control by a pump and a controller installed on the track system. In such embodiment, one may use a user control to automatically open the pressuring system, to add pressure to the pressuring system by using a remote controller and to close the pressuring system upon adjustment.

Now referring to FIGS. 27 to 30, the hydraulic pressuring system comprises connectors 47 to connect a grease/oil line in order to lower or increase the pressure. In such an embodiment, the oil or grease line (not shown) may be routed within the track assembly 1 to provide an easy access location. Understandably, such track adjustment system may be installed on any track system, including but not limited to a track system comprising a support frame having a first and a second portions being pivotally connected using a central pivoting member.

Referring to FIG. 28, increasing the pressure in cylinder 48A, typically by adding lubricant or oil, and decreasing the pressure in cylinder 48B, typically by letting lubricant or oil to exit the cylinder, will cause the wheel to rotate in the clockwise direction about the pivoting axis 43. When the desired alignment is adjusted, the cylinder is closed or sealed to keep the internal pressure of the cylinders and to maintain the adjustment.

Figure 31:
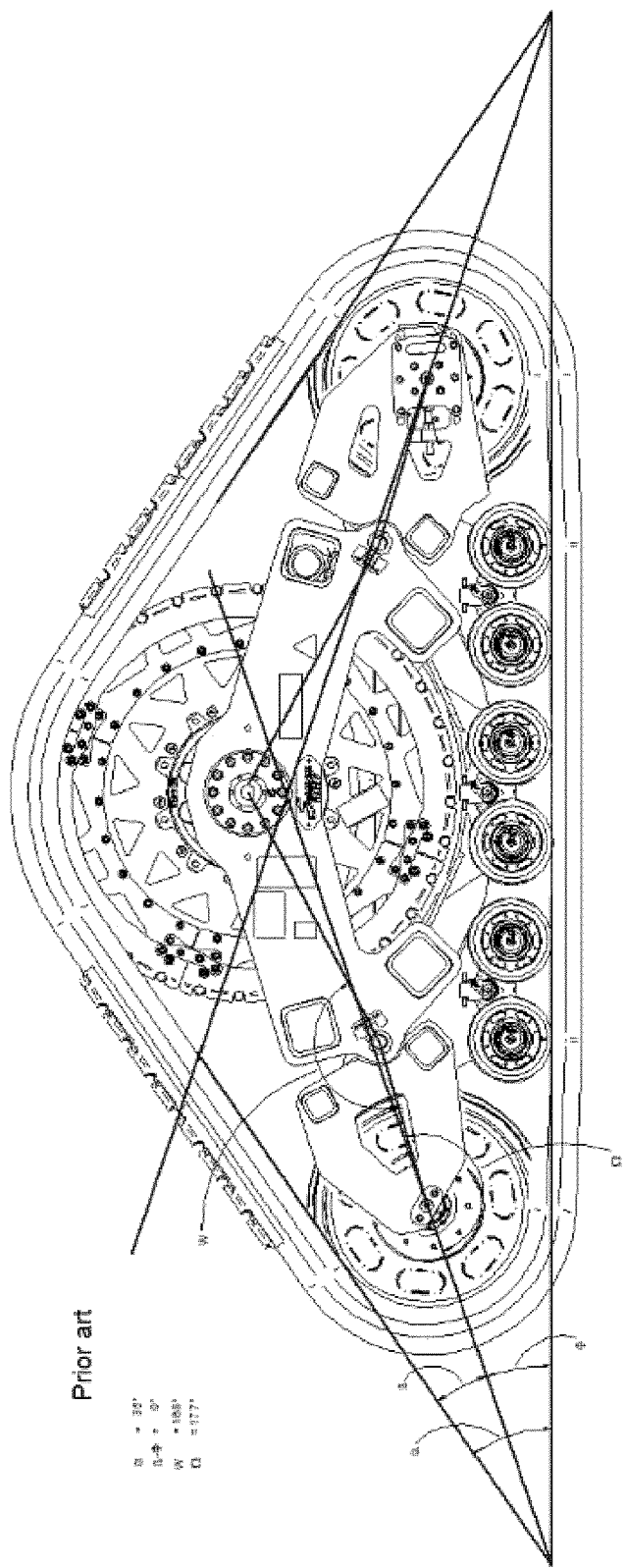
FIG. 31 is a side view of the tension present in a prior art track system.

Referring to FIG. 31, typically, current track systems of the prior art comprise a tensioner which allows the control of the tension of the track band around the sprocket wheel and of the idler wheels while ensuring that the tension is kept within an acceptable and working range.

Still referring to FIG. 31, a schematic of a track system of the prior art is illustrated in a normal condition of operation. As illustrated, the track band may be conceived as being generally shaped as a triangle; the sprocket wheel and the front and rear idler wheels defining the three sides of the triangle. With respect to the present embodiment involving a single frame (instead of split frame as illustrated embodiments of the present invention), the configuration of the track system components results in axis (defined by lines passing through the rotation axle of the idler wheels and the pivot axis connecting the frame to the tandem subassembly) joining under the vertical position of the frame pivot 20, itself under the vertical position of the vehicle drive axle (not illustrated).

Furthermore, the location of secondary pivots are typically located at a position while the track system is moving laterally or longitudinally, as to ensure that the endless track perimeter remains substantially constant, within a predetermined track tension range, within a track tension stroke predetermined length or to provision for debris ingestion.

Figure 32:
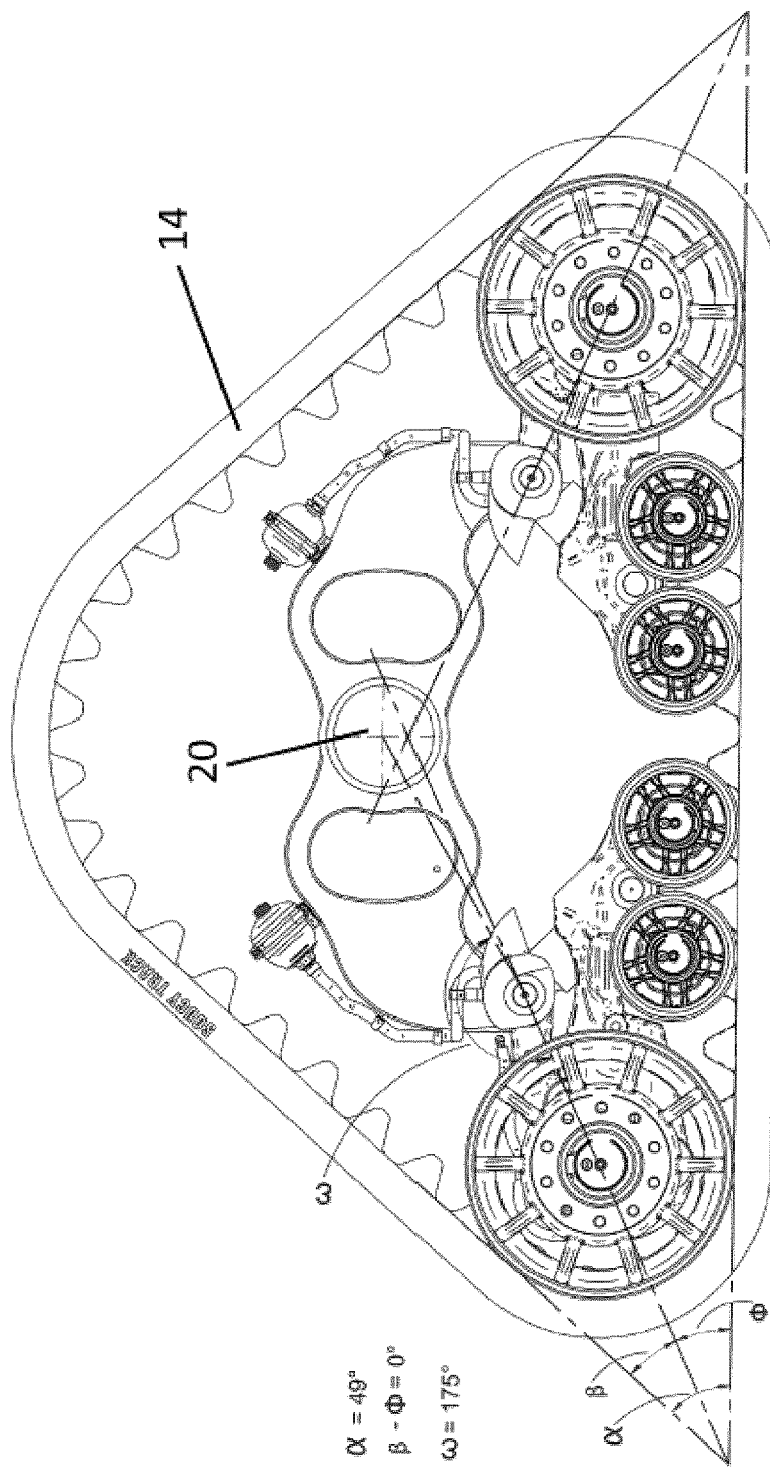
FIG. 32 is a side view of the tension to be obtained by a track system in accordance with the principles of the present invention.

Now referring to FIG. 32, in order to maintain such equilibrium, the location of the pivot point of the secondary pivoting assemblies also takes in account this variable, the exact position has to be determined precisely. The load resultant as a consequence of the traction shall pass through secondary pivot point to aim at preventing the oscillation of the tandem assembly under traction.

In one embodiment of the invention, the tensioner is an automatic component that dynamically reacts to changes in loads and in configuration for insuring that the track band 14 tension remains into the acceptable range.

Figure 33:
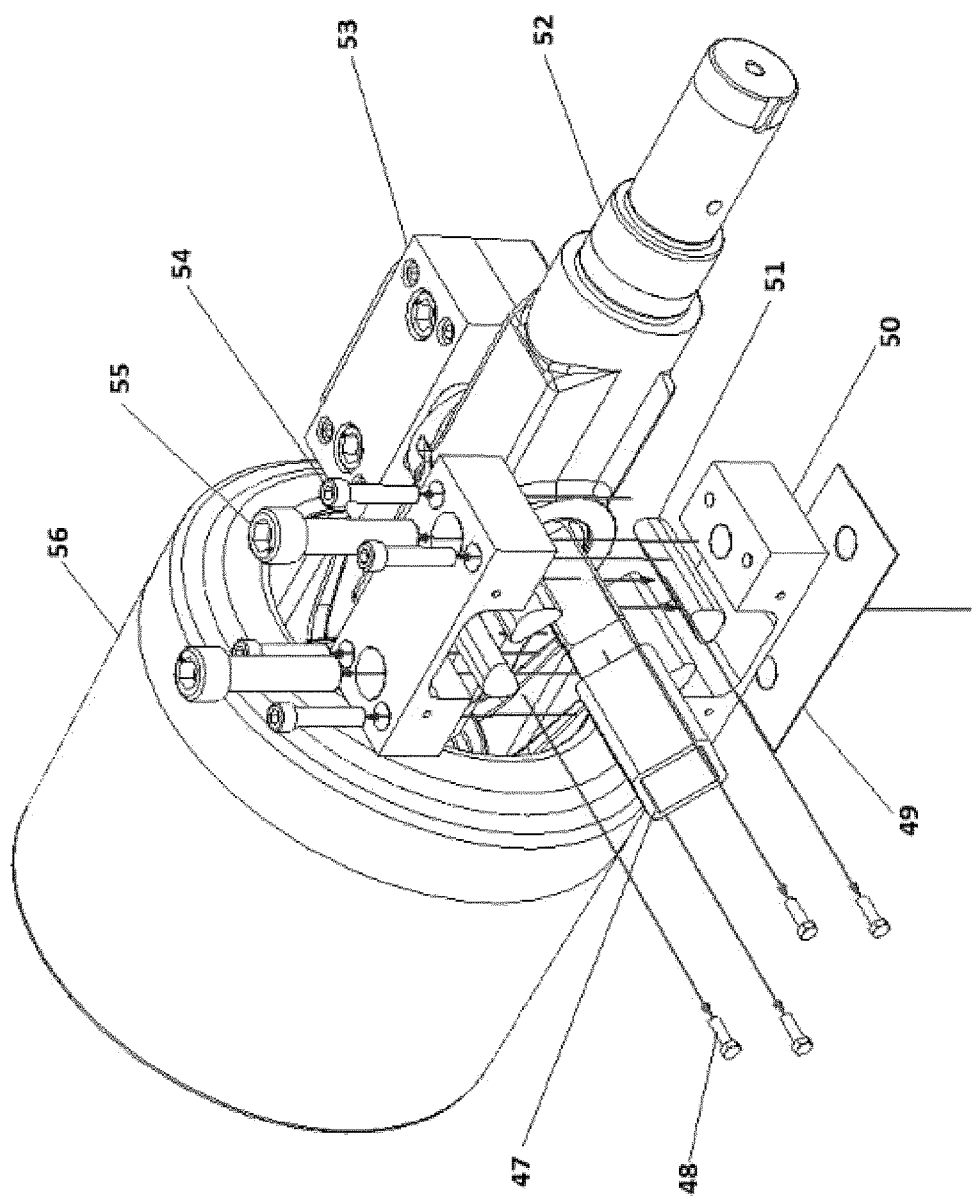
FIG. 33 is an embodiment of the track assembly using a Rosta lateral displacement.

Now referring to FIG. 33, a lateral tandem assembly (also known as "Rosta") is illustrated. The lateral tandem assembly allows slight rotations and restoration of the position of a piece, namely the axis linking two wheels, with respect to a general structure. Accordingly, the Rosta assembly uses an axial component 47 (shown as a square-shaped component) to be enclosed into casings 50 and 53 and to be inserted into an aperture of a wheel axle 52. Each casing 50 and 53 comprises an aperture (illustrated as a rounded square aperture) for receiving the axial component. As the overall external shape of the axial component 47 and the overall shape of the aperture of the casing are different, the difference between the two shapes is filled with elastomeric components 51 which tightly hold the axial component in place, thus allowing a slight rotation or tilting of the axial component 47 with respect to the aperture of the casings 50 and 53. The resulting structure ensures that a set of wheels may pivot laterally without using a pivot structure. However, regardless of the position and angles of the wheels, the wheels remain co-axial as an assembly.

Figure 34A:
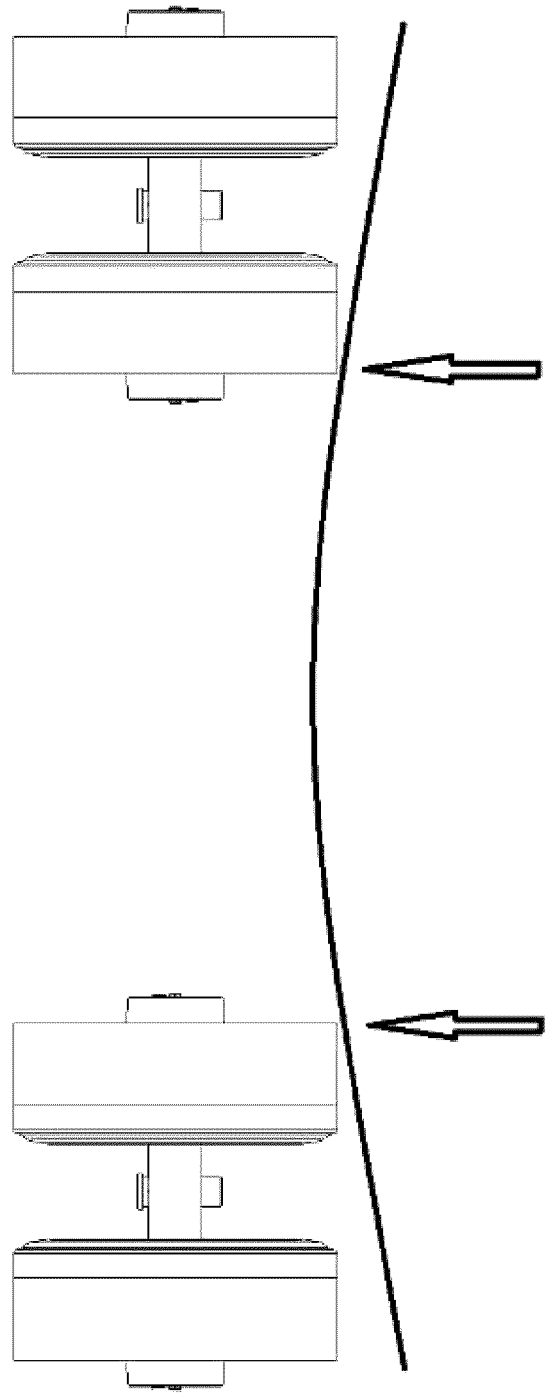
FIGS. 34A and B schematically illustrates the conditions wherein the rosta lateral displacement embodiment is not and is involved to provide improved comfort to the vehicle driver, according prior art response to a specific condition.
Figure 34B:
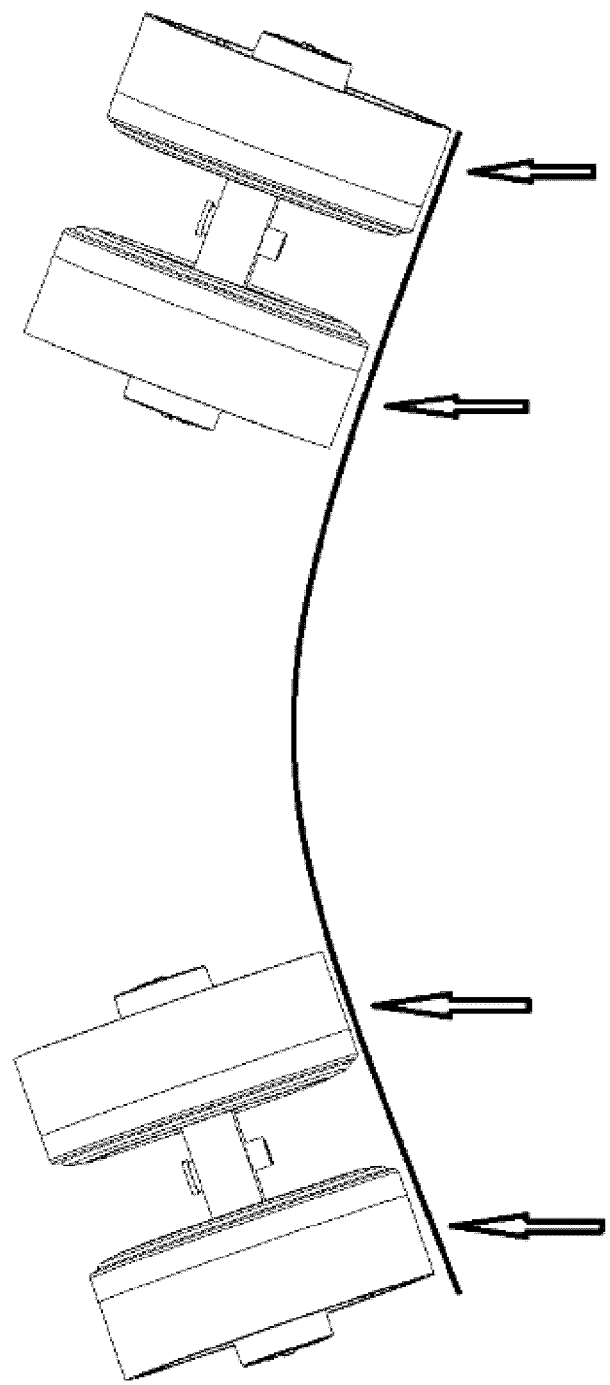

Now referring to FIGS. 34A and B, the position of the left and right set of wheels of a vehicle on uneven terrain is shown without and with a Rosta assembly, respectively. Referring to FIG. 34A, the arrows represent the force applied on the ground by the wheels. The said force substantially comes from the inner part of the inner wheels as no Rosta assembly is present. Now referring to FIG. 34B, a vehicle using an embodiment of a Rosta assembly in the same condition as FIG. 34A is shown. Accordingly, the force shown by the arrows is more evenly distributed between the wheels. Hence, as the load is evenly transmitted to the other components of the track system 1, fatigue and ruptures of components due to overload may be prevented or limited.

Now referring to FIGS. 35A to 35D, according to an embodiment having a front portion 16 and a second portion 18 of a support frame connected by a central pivot and by a suspension system 22, the suspension system 22 may be embodied as a variable damping component. Such variable damping component allows to the dynamic adaptation of the parameters of the suspension system as a function of the force absorbed by the track system. As an example, the said force may be transmitted to the track system 1 by a variation or imperfection of the terrain, by a cart or trailer attached to the vehicle or by adding weight on the vehicle, such as loading grain on the vehicle. In such an embodiment, a variable damping component using a specific damping value may be used as a passive system on a track system 1. In such an embodiment, the passive system is configured to allow the suspension system to adapt, such as being harder or softer, as a function of the force absorbed by the track system without any intervention by the vehicle operator, without any usage of an electric automate or without any communication means transferring the damping value between the vehicle and track system 1.

Figure 35A:
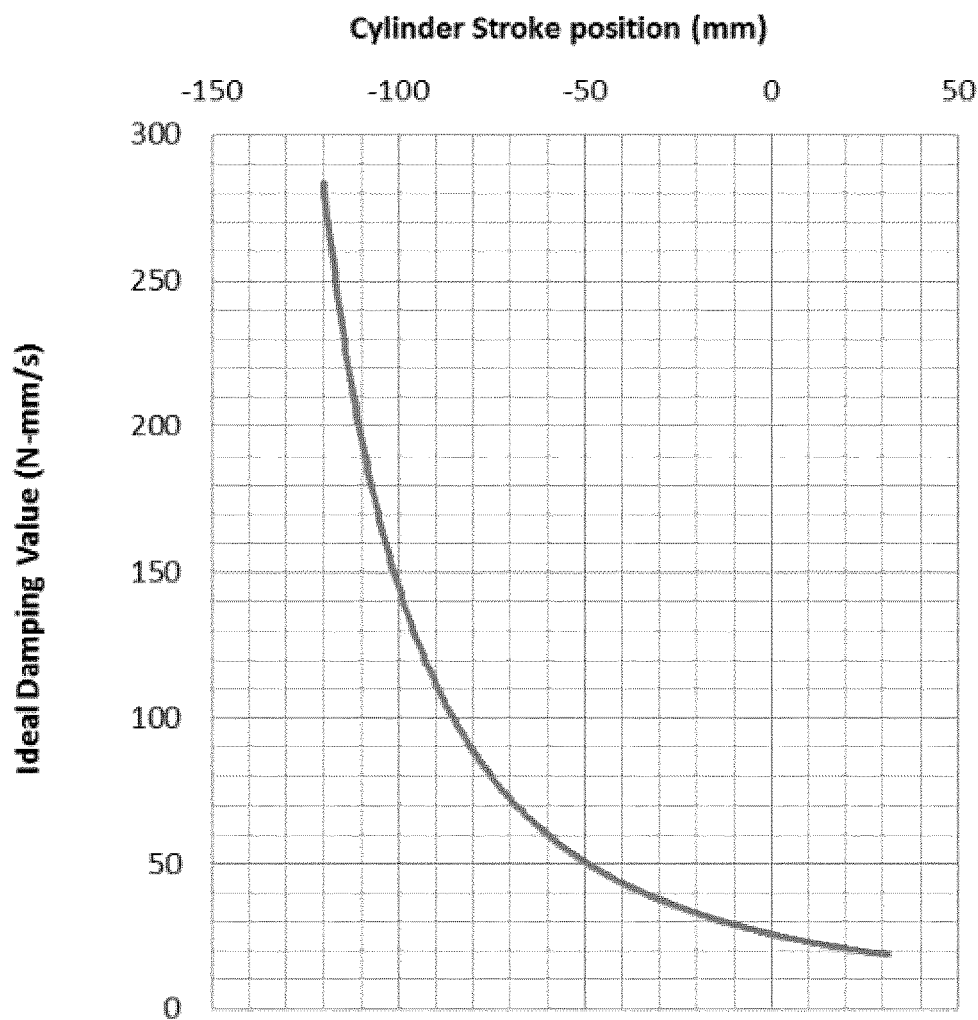
FIG. 35A is an exemplary diagram of cylinder stroke position values in relation to ideal damping value for a determined load on a specific terrain to respect a specific damping rate.

Now referring to FIG. 35A, an exemplary diagram presenting the stroke position of the cylinder (mm) as a function an optimal damping value is shown for a damping rate of 0.4 for a specific load condition.

In embodiment using variable damping value, the suspension system is configured to change the damping value of the suspension element as a function of either or both the spring rate and the weight as to maintain the damping rate substantially constant. Such constant damping rate allows the vehicle to maintain performance of the vehicle without regard to an increase in the load/weight or on obstacles hit by the track systems. Typically, a damping rate must remain constant for a specific type of terrain or relief. As an example, when the weight or the load of the vehicle increases, the damping value must also be increased to compensate for such increase of weight.

Understandably, any type of function dictating the variation of the spring rate value as a function of the stroke position of such as suspension system may be used. Typically, for standard mechanical springs, spring rate value is constant as a function of the stroke position. However, under types of springs, such as pneumatic, may provide a progressive variation of the spring rate value as a function of the stroke position (see for example FIG. 35C).

In typical suspension system, the value of the spring rate as a function of the cylinder stroke and the weight/force as a function of the cylinder stoke are known, thus, in such embodiments, only the damping value must be calculated and applied on the suspension system.

As an example, the damping rate would be calculated according to the following equation:

$$\text{Damping Rate} = \frac{\text{Actual Damping}\left(\frac{N \cdot s}{mm}\right)}{2 \cdot \sqrt{\text{Spring Rate}\left(\frac{N}{mm}\right) \cdot \text{Weight}(T)}}$$

Still referring to an embodiment using a passive system on a vehicle having a perfect damping rate, the track system 1 may comprise a semi-active and active suspension system where the stroke position adjusts the damping value. Thus, the damping value may be changed by adding progressive groove openings on the cylinder 22 surface.

Figure 35B:
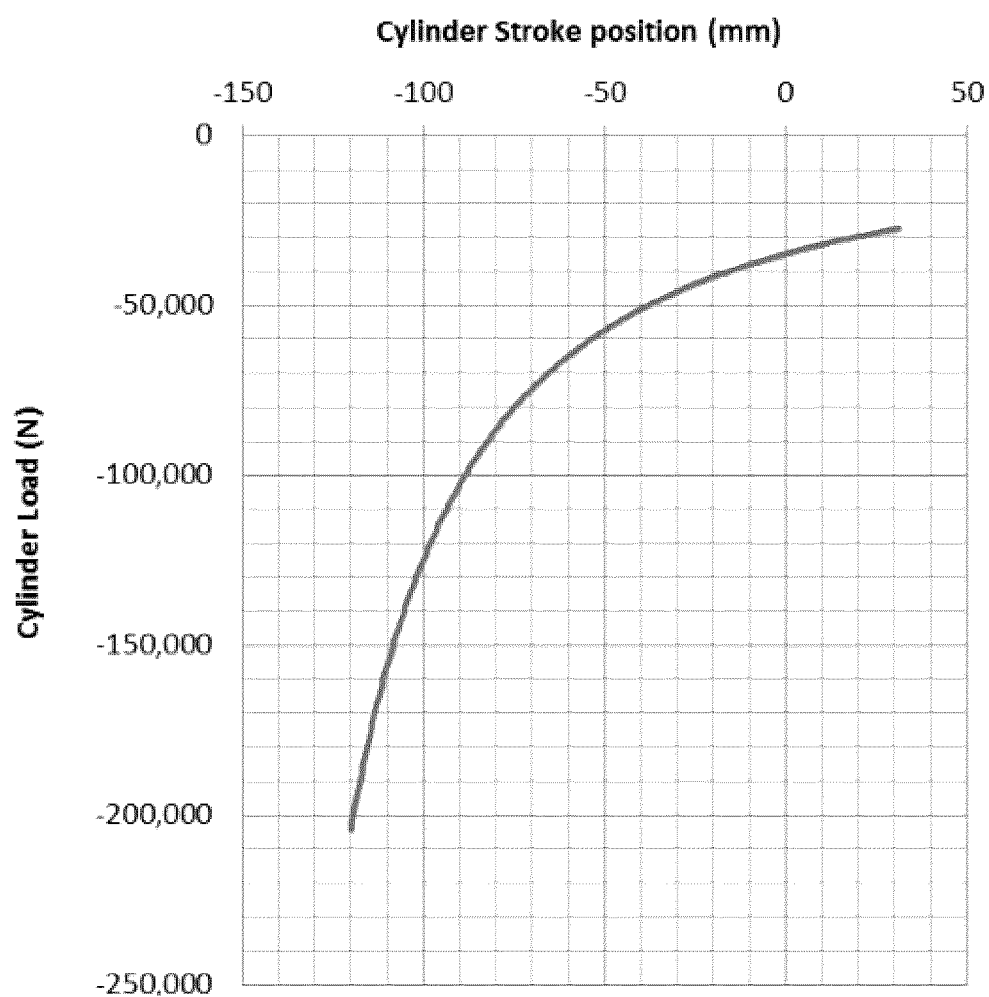
FIG. 35B is an exemplary diagram of cylinder stroke position values in relation to cylinder load for a determined load on a specific terrain to respect a specific damping rate.
Figure 35C:
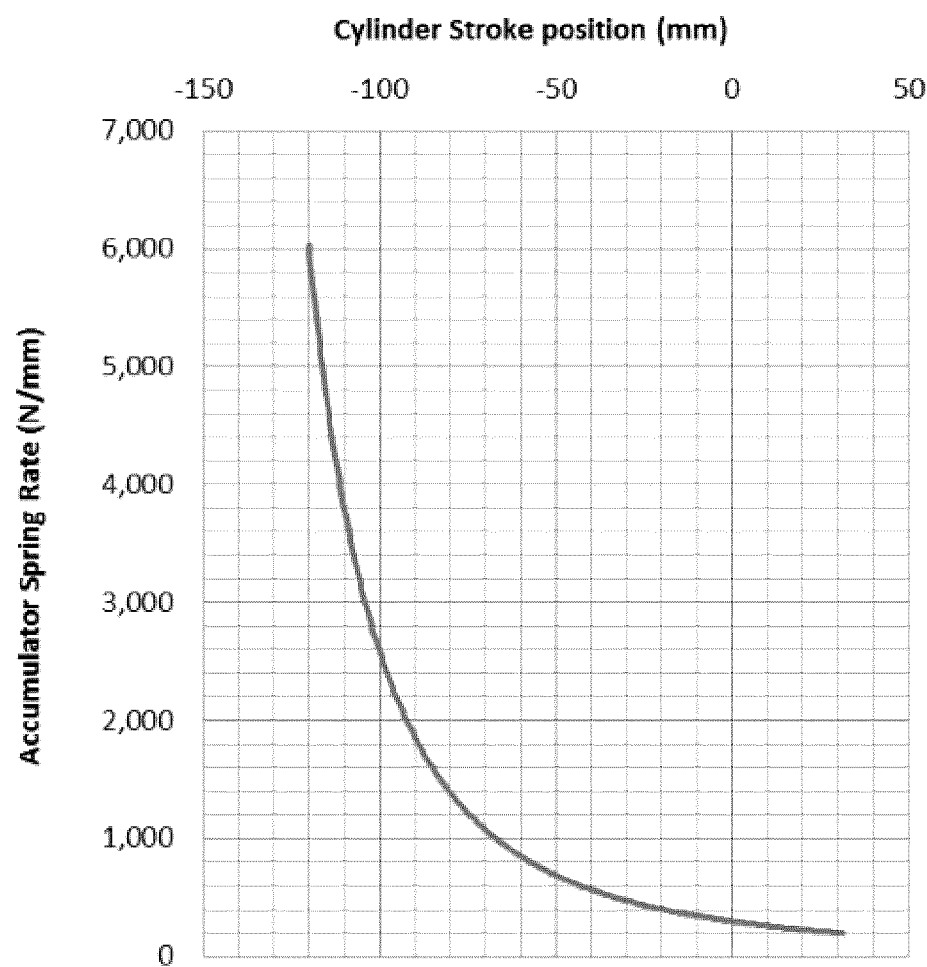
FIG. 35C is an exemplary diagram of cylinder stroke position values in relation to accumulator spring rate for a determined load on a specific terrain to respect a specific damping rate.
Figure 35D:
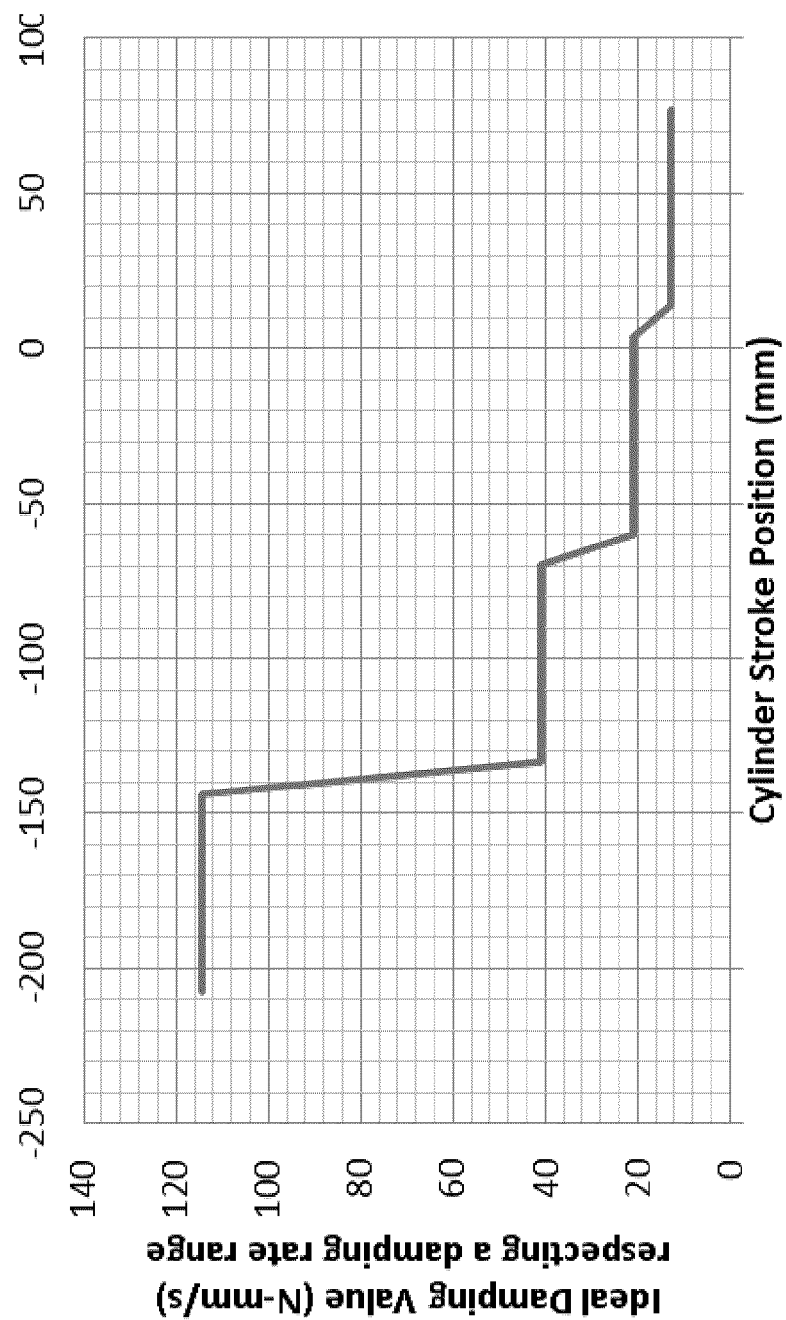
FIG. 35D is an exemplary diagram of cylinder stroke position values in relation to ideal damping value with respect to a step function respecting a range of damping rates for a determined load on a specific terrain to respect a specific damping rate.

Now referring to FIGS. 35B and 35C, other examples of graphical representation of the cylinder load as a function of the cylinder stroke position and/or load and of the accumulator spring rate as a function of the cylinder stroke position for a specific damping value are presented. Accordingly, the stroke position must be changed in order to obtain a specific damping value. Thus, in such embodiment, the damping ratio would be variable as a function of the stroke position but would remain within an acceptable damping ratio range. The damping value as a function of the stroke position may be progressive, a step function, or allowing at least 2 different damping values or any other function adapted to the specific conditions of use of the vehicle. Furthermore, in some embodiments, the suspension system may be configured to provide a very high damping value at the beginning and/or at the end of the cylinder stroke position in order to limit the speed at which the cylinder is reaching the end of the suspension element or being pulled out of the suspension element.

Figure 36:
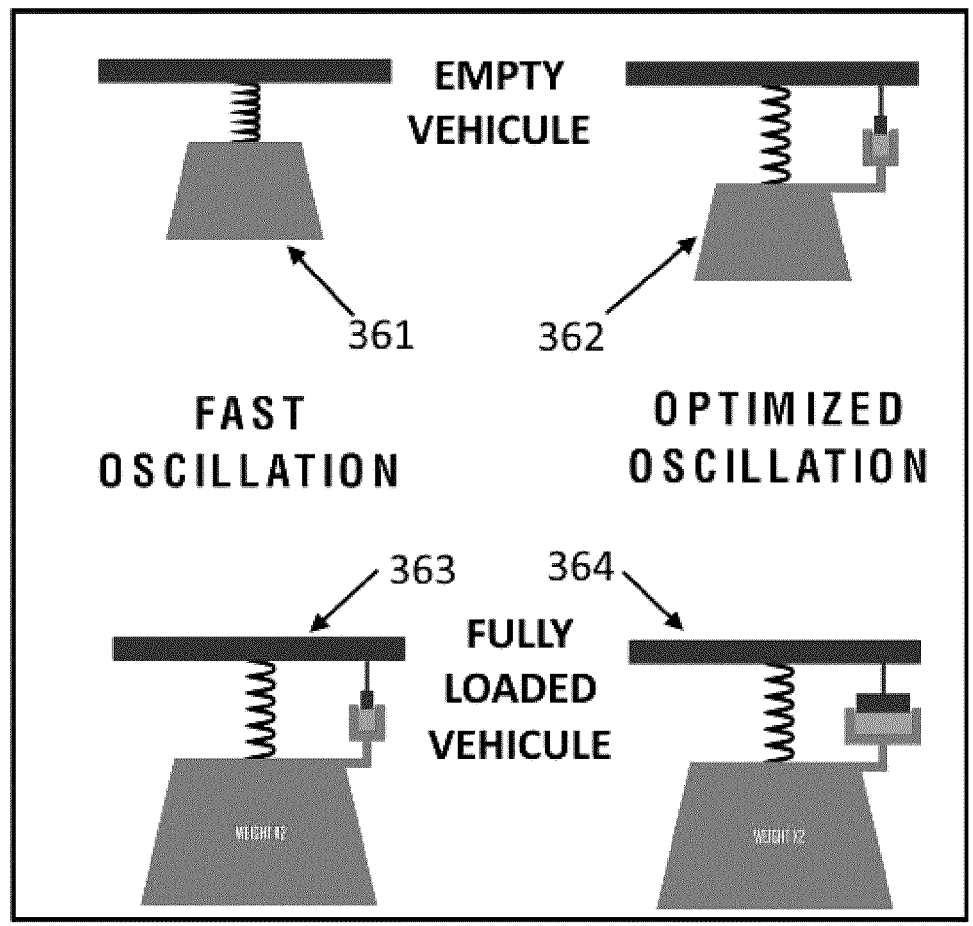
FIG. 36 is an illustration of the oscillation resulting from fast oscillation resulting of a track assembly without damping system or with limited damping system and from an optimized oscillation resulting of a track assembly comprising an optimal damping.

Now referring to FIG. 36, a schematic illustration of the effect of dampening systems on a vehicle when being empty and when being loaded. When unloaded, the oscillation of a suspended weight (weight of the vehicle) is fast without damping system 361. The oscillation may be optimized by using a damping system having a limited damping value 362. However, using the same damping value when the vehicle is loaded (such as weight×2) may revert to fast oscillation 363. Thus, a progressive damping system allows the increase of the damping value at a higher weight and thus maintains the damping ratio at an optimized level to provide optimized oscillation 364.

Figure 37C:
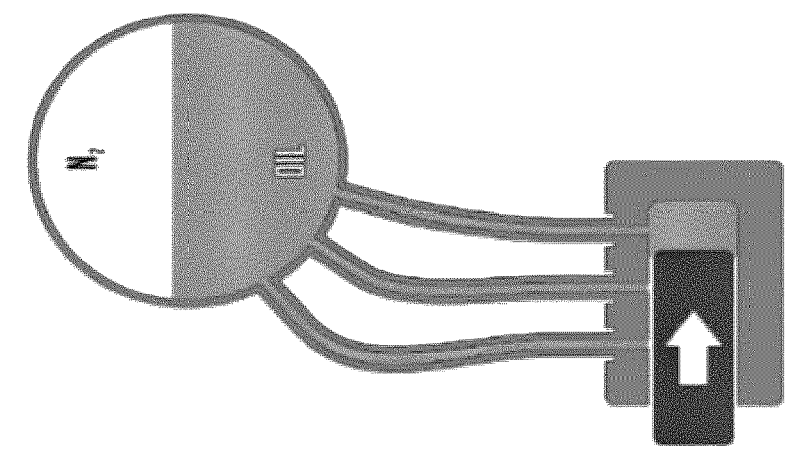
FIG. 37A to C are schematic illustrations of an embodiment of a progressive or step function damping system.
Figure 37B:
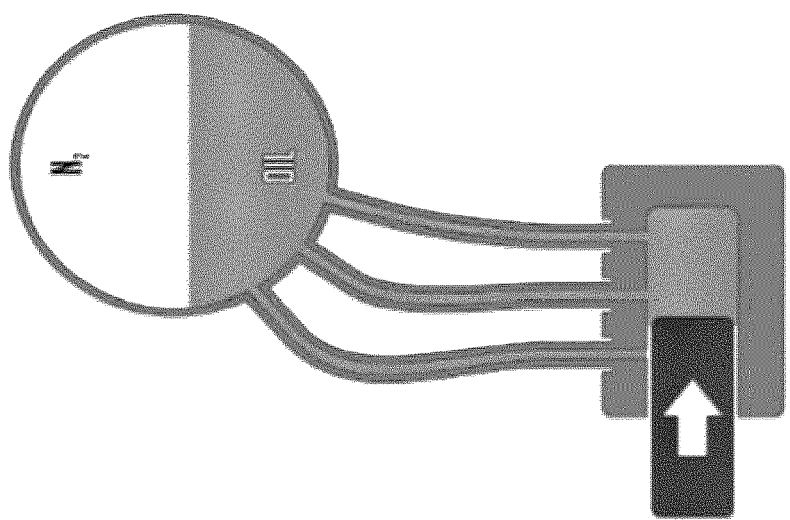
Figure 37A:
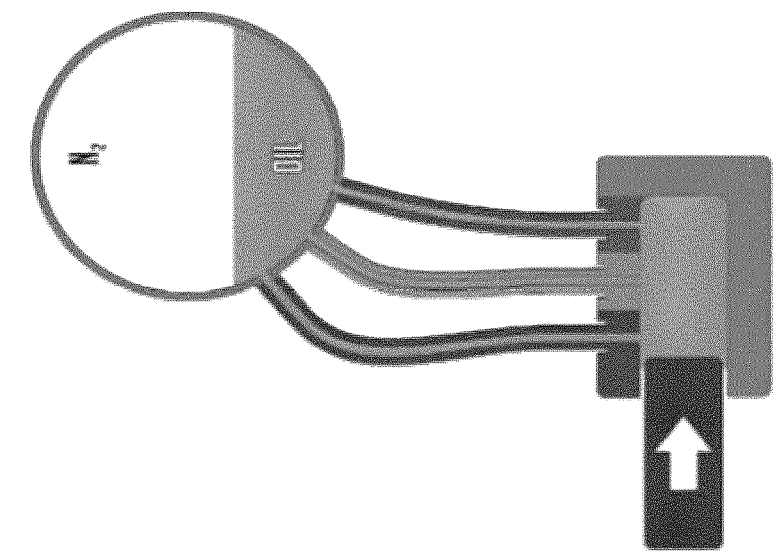

Now referring to FIGS. 37A to 37C, an exemplary progressive damping system using variable output volume is shown. In such a configuration, the damping value is changed as suspension is compressed and cylinder stroke position is further inside the suspension. In such a progressive damping system, the debit of oil in the cylinder is controlled using different channels or passages leading to an oil reservoir, typically filled with $N_2$.

In other embodiments, dynamic damping may be embodied by following damping increments or steps or using any variable or adaptable damping systems known in the art, such as having an internal cylinder being shaped to allow the internal pressure to vary as a function of the stroke position, thus allowing damping value to adapt to specific forces applied to the suspension system, such as solution developed by Horstman Systems Inc., located in Vaughan, ON, Canada.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system for a vehicle, the track system comprising:
    a drive wheel configured to be mounted to the vehicle;
    a support frame comprising:
        a first portion pivotally connected to a second portion, at least one of the first and second portions comprising a first aperture defined therein, each portion of the support frame defining a second aperture at one end of each of the portions, the pivoting connection between the first and second portions being formed by the superposition of the second aperture of the first and second portions;
        a suspension system controlling the pivoting movement of each of the two portions in relation to the other portion;
    front idler wheels pivotally mounted to the support frame;
    rear idler wheels pivotally mounted to the support frame;
    road wheels pivotally mounted to the support frame; and
    an endless track disposed about the drive wheel, the front and rear idler wheels, and the road wheels, the endless track defining an overall perimeter of the track system.

2. The track system of claim 1, wherein the first aperture is adapted to allow passage of a drive shaft of the vehicle, and the pivoting of each of the two portions in relation to the other portion.

3. The track system of claim 1, wherein the first and second portions of the support frame have the first aperture defined therein, the first aperture being adapted to allow passage of a drive shaft of the vehicle, and the pivoting of each of the two portions in relation to the other portion.

4. The track system of claim 1, wherein each portion of the support frame further comprises a third aperture being adapted to receive a mechanical stop adapted to limit the pivoting of each of the two portions in relation to the other portion.

5. The track system of claim 1, wherein the first and second portions of the support frame are coupled to a final drive, the final drive being coupled to a drive shaft of the vehicle.

6. The track system of claim 1, wherein the front idler wheels and at least one of the road wheels are pivotally mounted to a front tandem support frame, the front tandem support frame being pivotally connected to the first portion of the support frame.

7. The track system of claim 1, wherein the rear idler wheels and at least one of the road wheels are pivotally mounted to a rear tandem support frame, the rear tandem support frame being pivotally attached to the second portion of the support frame.

8. The track system of claim 1, wherein the suspension system is a variable damping system.

9. The track system of claim 8, wherein the damping value of the variable damping system is calculated using the following equation:

$$\text{Damping Rate} = \frac{\text{Actual Damping}\left(\frac{N \cdot s}{mm}\right)}{2 \cdot \sqrt{\text{Spring Rate}\left(\frac{N}{mm}\right) \cdot \text{Weight}(T)}}.$$

10. The track system of claim 8, wherein the suspension system is progressive.

11. The track system of claim 8, wherein the suspension system is configured to allow at least two different damping values.

12. A track system for a vehicle, the track system comprising:
- a drive wheel configured to be mounted to the vehicle;
- a support frame comprising:
  - a front portion pivotally connected to a rear portion, each portion of the support frame defining an aperture at one end of each of the portions, the pivoting connection between the front and rear portions being formed by the superposition of the aperture of the front and rear portions, at least one of the front and rear portions being adapted to allow passage of a drive shaft of the vehicle through the support frame and the pivoting of the each of the front and rear portions in relation to the other portion;
  - a suspension system controlling the pivoting movement of each of the two portions in relation to the other portion;
- front idler wheels pivotally mounted to the front portion of the support frame;
- rear idler wheels pivotally mounted to the rear portion of the support frame;
- at least one set of road wheels, wherein a first road wheel is pivotally mounted to the front portion of the support frame and a second road wheel is pivotally mounted to the rear portion of the support frame and wherein the first and second road wheels are substantially aligned with respect to a lateral axis in a rest position; and
- an endless track disposed about the drive wheel, the front and rear idler wheels, and the at least one set of road wheels, the endless track defining an overall perimeter of the track system.

13. The track system of claim 12, wherein the first road wheel is configured to independently move in relation with the second road wheel.

14. The track system of claim 12, wherein the front idler wheels and at least one of the first and second road wheels are pivotally mounted to a front tandem support frame, the front tandem support frame being pivotally connected to the front portion of the support frame.

15. The track system of claim 12, wherein the rear idler wheels and at least one of the first and second road wheels are pivotally mounted to a rear tandem support frame, the rear tandem support frame being pivotally attached to the rear portion of the support frame.

16. The track system of claim 12, wherein the suspension system is a variable damping system.

17. The track system of claim 16, wherein the damping value of the variable damping system is calculated using the following equation:

$$\text{Damping Rate} = \frac{\text{Actual Damping}\left(\frac{N \cdot s}{mm}\right)}{2 \cdot \sqrt{\text{Spring Rate}\left(\frac{N}{mm}\right) \cdot \text{Weight}(T)}}.$$

18. The track system of claim 16, wherein the suspension system is progressive.

19. The track system of claim 16, wherein the suspension system is configured to allow at least two different damping values.

* * * * *